US010891793B2

(12) United States Patent
Evans

(10) Patent No.: US 10,891,793 B2
(45) Date of Patent: *Jan. 12, 2021

(54) REALITY TO VIRTUAL REALITY PORTAL FOR DUAL PRESENCE OF DEVICES

(71) Applicant: Microsoft Technology Licensing, LLC, Redmond, WA (US)

(72) Inventor: Patrick W. J. Evans, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,138

(22) Filed: Mar. 18, 2019

(65) Prior Publication Data

US 2019/0213796 A1 Jul. 11, 2019

Related U.S. Application Data

(63) Continuation of application No. 15/199,297, filed on Jun. 30, 2016, now Pat. No. 10,235,809.

(51) Int. Cl.
*G06T 19/00* (2011.01)
*G06T 15/00* (2011.01)
*G06Q 90/00* (2006.01)
*G06F 3/0481* (2013.01)

(52) U.S. Cl.
CPC ........ *G06T 19/006* (2013.01); *G06F 3/04815* (2013.01); *G06Q 90/00* (2013.01); *G06T 2200/28* (2013.01)

(58) Field of Classification Search
CPC .................................................. G06T 19/006

USPC ........................................................ 345/633
See application file for complete search history.

(56) References Cited

U.S. PATENT DOCUMENTS 10,235,809 B2\* 3/2019 Evans .................... G06Q 90/00
10,467,814 B2\* 11/2019 Loberg ................... G06T 15/10

OTHER PUBLICATIONS

"Office Action Issued in European Patent Application No. 17733241. 8", dated Feb. 24, 2020, 7 Pages.

\* cited by examiner

*Primary Examiner* — Javid A Amini
(74) *Attorney, Agent, or Firm* — Alleman Hall Creasman & Tuttle LLP

(57) ABSTRACT

In various embodiments, computerized methods and systems for virtualizing electronic devices for utilization in virtual environments are provided. An electronic device located within the vicinity is detected and identified. A virtual object that corresponds to the identified electronic device is obtained for rendering within an immersive virtual environment. The virtual object can include an interactive portion that, when rendered, can provide an interactive virtual experience with what appears to be a virtualized instance of the identified electronic device. The interactive portion of the virtual object is bound to a corresponding interactive portion of the identified electronic device, so that interaction data is properly communicated and interpreted therebetween. The virtual object, having its interactive portion bound to the interactive portion of the identified electronic device, is rendered in virtual space, such that virtual interactions therewith facilitate real interactions with the identified electronic device.

20 Claims, 11 Drawing Sheets

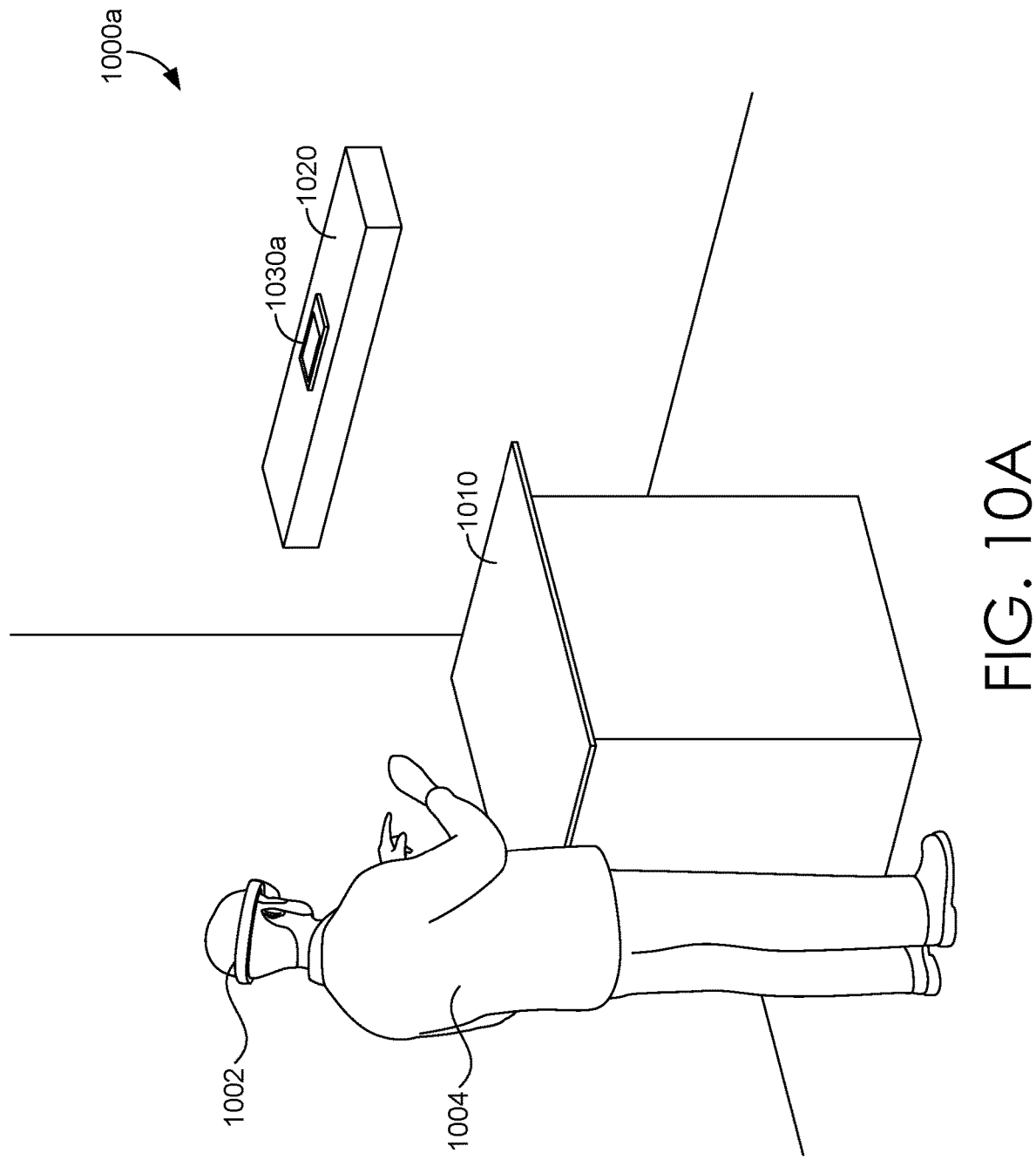

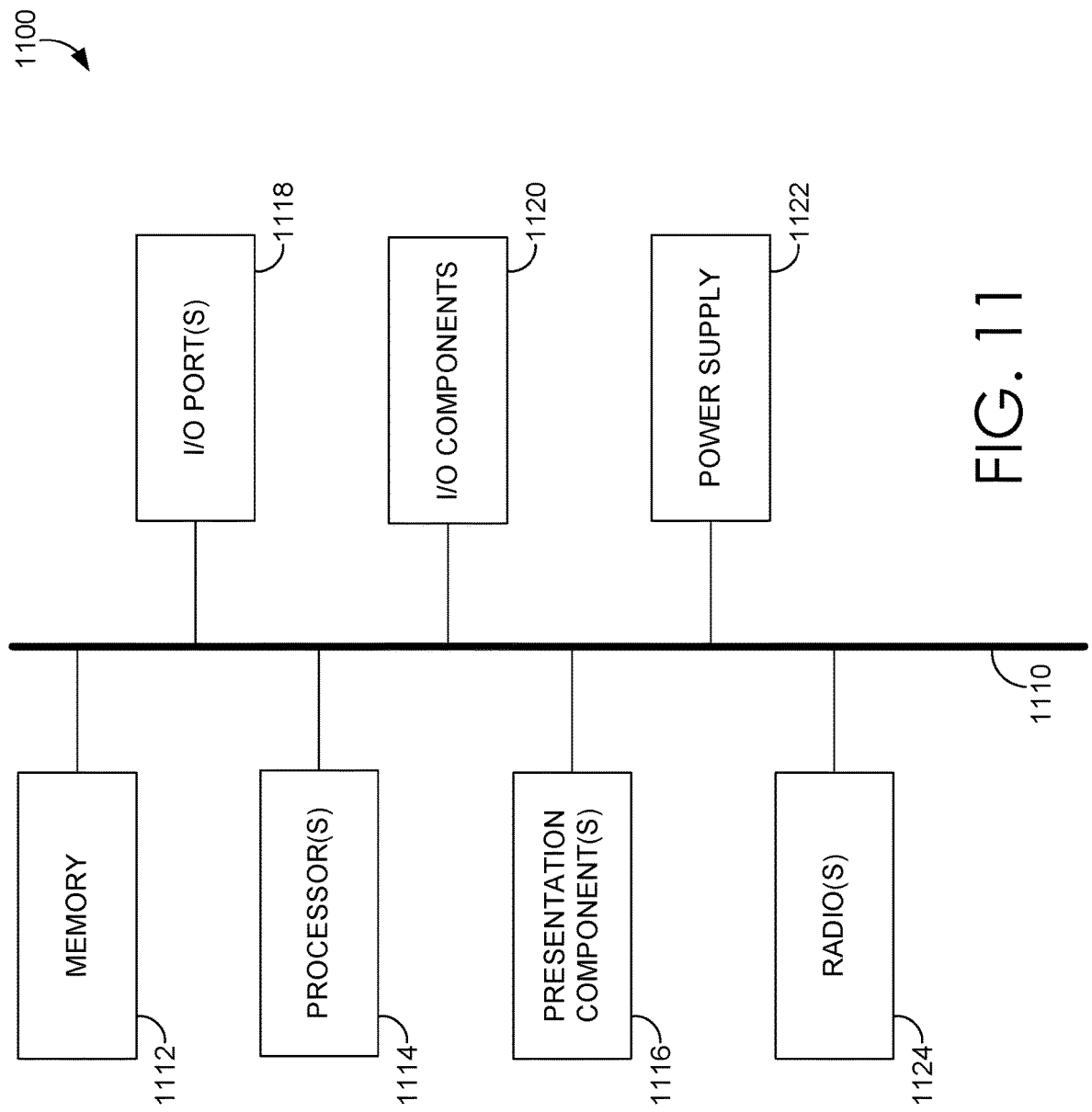

REALITY TO VIRTUAL REALITY PORTAL FOR DUAL PRESENCE OF DEVICES

CROSS REFERENCE TO RELATED APPLICATIONS

This application is a continuation of U.S. patent application Ser. No. 15/199,297, filed Jun. 30, 2016 the entire contents of which is hereby incorporated herein by reference for all purposes.

BACKGROUND

Virtual reality is becoming an increasingly popular form of immersive technology. Virtual reality technology employs specialized computing hardware and software to provide users with perceptually-real and fully-immersive virtual environments to interact with and explore. Virtual reality technologies can place users into virtual environments where they can perceive and interact with virtual objects rendered within simulated worlds. While such virtual objects may appear to be present in a user's perceived virtual environment, they are typically not present in the user's immediate physical world.

In some ways, virtual environments can be too immersive, in that objects of the physical world cannot be perceived or utilized by users when immersed in virtual space. Objects that can be perceived in virtual space are graphically rendered as virtual objects, to be perceived and interacted with by users. Virtual objects may serve some utility in virtual environments. For instance, a virtual tool in an immersive game can be virtually utilized to perform certain tasks within the virtual environment. Users regularly find the need, however, to remove themselves from these virtual environments to perceive and interact with physical objects that are present and limited to the physical world.

Electronic devices, such as mobile phones, computers, televisions, wearables, remote controllers, input devices, and the like, are physical objects in the physical world that regularly serve some practical utility to users. When immersed in a virtual environment, however, users are unable to perceive and interact with these devices. It would be beneficial to effectively utilize such devices while immersed in virtual environments.

SUMMARY

Embodiments described herein provide methods and systems for virtualizing electronic devices for interaction in virtual environments. More specifically, an electronic device can be determined to be located within a portal zone by a computing device associated with the portal zone. Based on identifying information associated with the electronic device, the computing device can identify the electronic device as one that can be virtually rendered for interaction within a virtual environment. The computing device can obtain a virtual object that corresponds to the identified electronic device. The virtual object obtained by the computing device can include, among other things, an interactive portion that corresponds to an interactive portion of the electronic device and, in some instances, a non-interactive portion that corresponds to a non-interactive portion of the electronic device. In essence, virtual input and/or output components (i.e., the interactive portion) of the electronic device and, in some instances, a three-dimensional model and texture (i.e., the non-interactive portion) of the electronic device can be included in the virtual object. The computing device can bind the interactive portion of the obtained virtual object to the corresponding interactive portion of the electronic device, such that interaction data generated in response to detected interactions with the rendered virtual object can be communicated to the electronic device. In this regard, the electronic device can process the generated interaction data as if the interactions occurred on the electronic device in physical space.

Similarly, interaction data generated by the electronic device in physical space can be communicated to the computing device, so that the computing device can process the interaction data for output via the rendered virtual object or other output devices. In other words, inputs detected on a virtual instance of an electronic device in virtual space are communicated to the electronic device for processing as inputs in physical space, while outputs generated by the electronic device in physical space are communicated to the computing device for processing as outputs in virtual space. In this regard, the computing device serves as a proxy between the identified electronic device in physical space, and the virtual object representing the identified electronic device in virtual space.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 10A is an illustration showing an exemplary physical space for utilizing a head-mounted display unit to virtualize electronic devices, in accordance with some implementations of the present disclosure;

FIG. 11 is a block diagram of an exemplary computing environment suitable for use in implementing embodiments of the present invention.

DETAILED DESCRIPTION

Figure 1A:
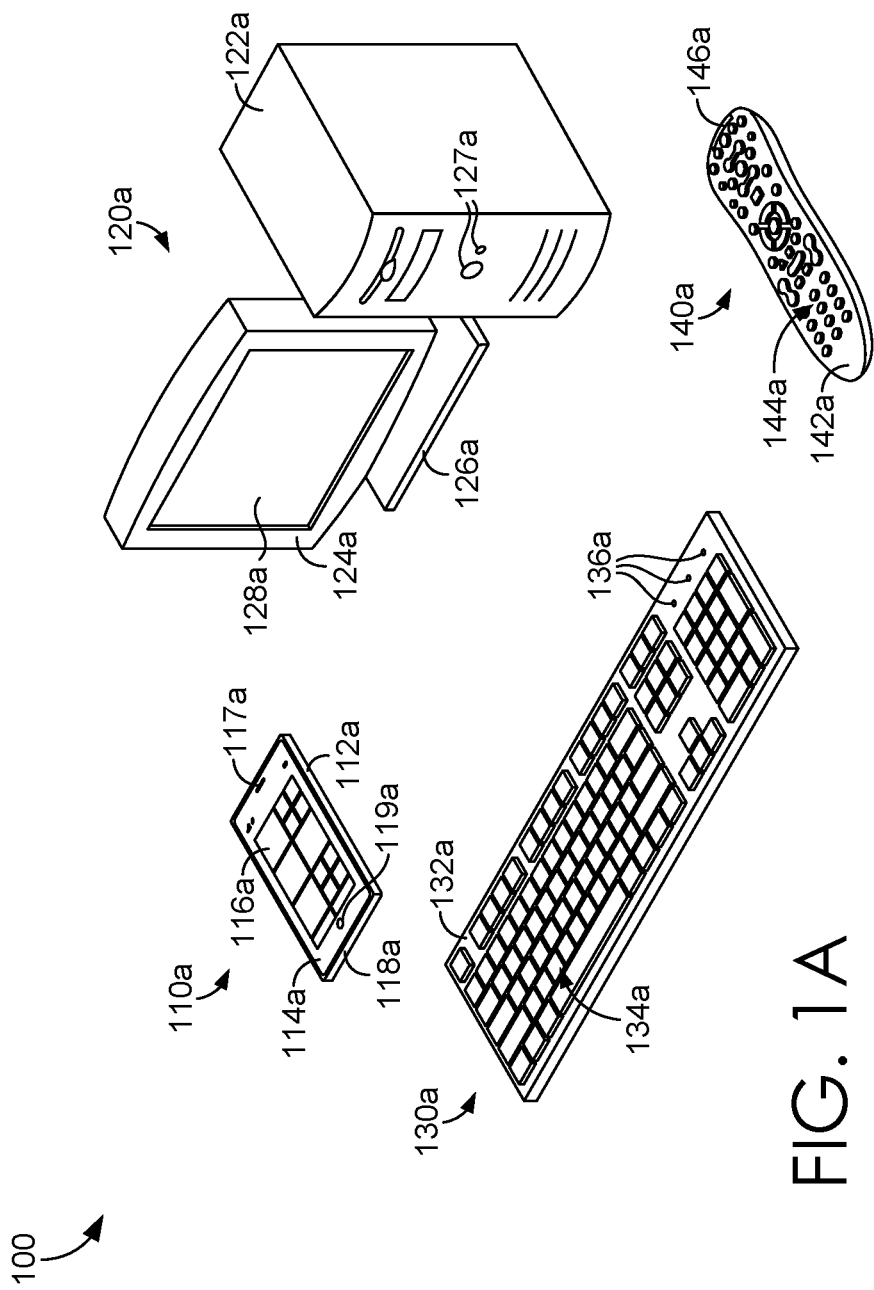
FIG. 1A are illustrations showing exemplary electronic devices as they would appear in physical space, in accordance with some implementations of the present disclosure.

Immersive technology refers to perceptual and interactive technologies that, in essence, blur the line between the physical world and the simulated world. Perceptual technologies can trick a user's brain into believing that digital information being perceived in virtual space is real. Interactive technologies, on the other hand, can recognize user outputs (e.g., speech, gestures, movements, etc.) detected in physical space, and can respond to it in virtual space, accordingly. Together, perceptual and interactive technologies can provide users with an illusion that an immersive virtual environment or "virtual space" is just as real as the physical environment or "physical space" in which they are present.

Some types of immersive technologies are not entirely immersive. For instance, augmented reality is one type of immersive technology that can provide continued perception of the surrounding physical environment, typically augmented with virtualized objects that can be "environment aware." In this regard, rendered virtual objects supplement perceived physical environments to create an augmented virtual environment, so that users can perceive and interact with both physical objects and virtual objects within the augmented space.

Virtual reality is also an immersive technology, but one that is fully immersive. That is, virtual reality users can only perceive the environment and objects rendered by the applied perceptual technologies. In some instances, the rendered environment and objects can also be programmatically configured for virtual interaction enabled by applied interactive technologies. In essence, only the "virtualized" objects can be perceived and interacted with in virtual space. Virtual reality can virtually transport users to entirely different worlds and realities by transforming their perceived space. While virtual reality can have its benefits, one particular drawback is the inability for users to perceive and interact with physical objects while immersed in virtual environments. By way of example, a user may be immersed in a virtual world of a virtual reality game when an incoming text is received on her mobile phone. Assuming that the phone is in the user's pocket, the user can bring out the phone, but must leave the simulated world (e.g., by taking off a head mounted display) to see the phone and respond to the text accordingly. Assuming that the phone is located on the opposing side of the room, the user must leave the simulated world, get up to retrieve the phone, and respond to the text.

Electronic devices can be particularly challenging to port from physical space into virtual space. On one hand, the physical shape, structure, and overall appearance of an electronic device must be replicated, imported, and rendered within virtual space. On the other hand, inputs, outputs, and all other interfacing aspects of the electronic device must be translated from virtual space to physical space, and vice versa. In this regard, a proxy framework must be implemented to enable the porting of electronic devices from physical space to virtual space.

Embodiments of the present disclosure provide systems and methods for virtualizing electronic devices for interaction in fully-immersive and partially-immersive virtual environments. In some embodiments, an electronic device can be detected and determined to be located within a portal zone. The electronic device can have associated identifying information, which can be detected by a computing device associated with the portal zone to identify a model and/or device identifier of the electronic device. The computing device can obtain a virtual object that corresponds to the electronic device based on its identifying information. For instance, the virtual object can be obtained from a remote server device, a locally stored configuration file, a removable computer readable medium, or the like. In various embodiments, the virtual object can be indexed, requested, retrieved, and/or obtained based on its model and/or device identifier. The virtual object can include an interactive virtual portion that corresponds to an interactive real portion of the identified electronic device, and can also include a non-interactive virtual portion that corresponds to a non-interactive virtual portion of the identified electronic device.

Once the virtual object corresponding to the identified electronic device is obtained, the computing device can bind the interactive virtual portion of the virtual object to the corresponding interactive real portion of the identified electronic device. In other words, the computing device can serve as a proxy between each input and/or output component of the identified electronic device and a corresponding virtual input and/or virtual output component of the virtual object. In this way, the computing device can render the virtual object in virtual space, including the bound interactive virtual portion, to facilitate virtual interaction with the identified electronic device.

In some other embodiments, an electronic device can be detected and determined to be located within a portal zone. The electronic device can receive a request for identifying information from a computing device associated with the portal zone. The electronic device can provide its associated identifying information to the computing device in response to the request. The electronic device can receive a request from the computing device to establish a virtualized remote operation session therewith, so that the computing device can serve as a proxy between a rendered virtual object corresponding to the electronic device, and the electronic device itself. The electronic device can establish the virtualized remote operation session with the computing device utilizing various networking or peer-to-peer technologies.

The identified electronic device and computing device can be parties to a binding operation, performed over the established virtualized remote operation session, to bind or "couple" an interactive virtual portion of the rendered virtual object to an interactive real portion of the corresponding electronic device. In this way, any detected virtual interaction with the interactive virtual portion in virtual space can be sent, as incoming interaction data, to the electronic device through the established virtualized remote operation session. The electronic device can then process the incoming interaction data it receives from the computing device as real interaction(s) with the interactive real portion of the electronic device. Similarly, any outputs generated by the electronic device in physical space can be sent, as outgoing interaction data, to the computing device through the established virtualized remote operation session. The computing device can then process the outgoing interaction data it receives from the electronic device, and render it as virtual outputs associated with the virtual object in virtual space. In some instances, the outgoing interaction data can be provided as outputs associated with the virtual object in virtual space (e.g., sounds played through speakers via the HMD, haptic feedback felt through the HMD, etc.).

Figure 1B:
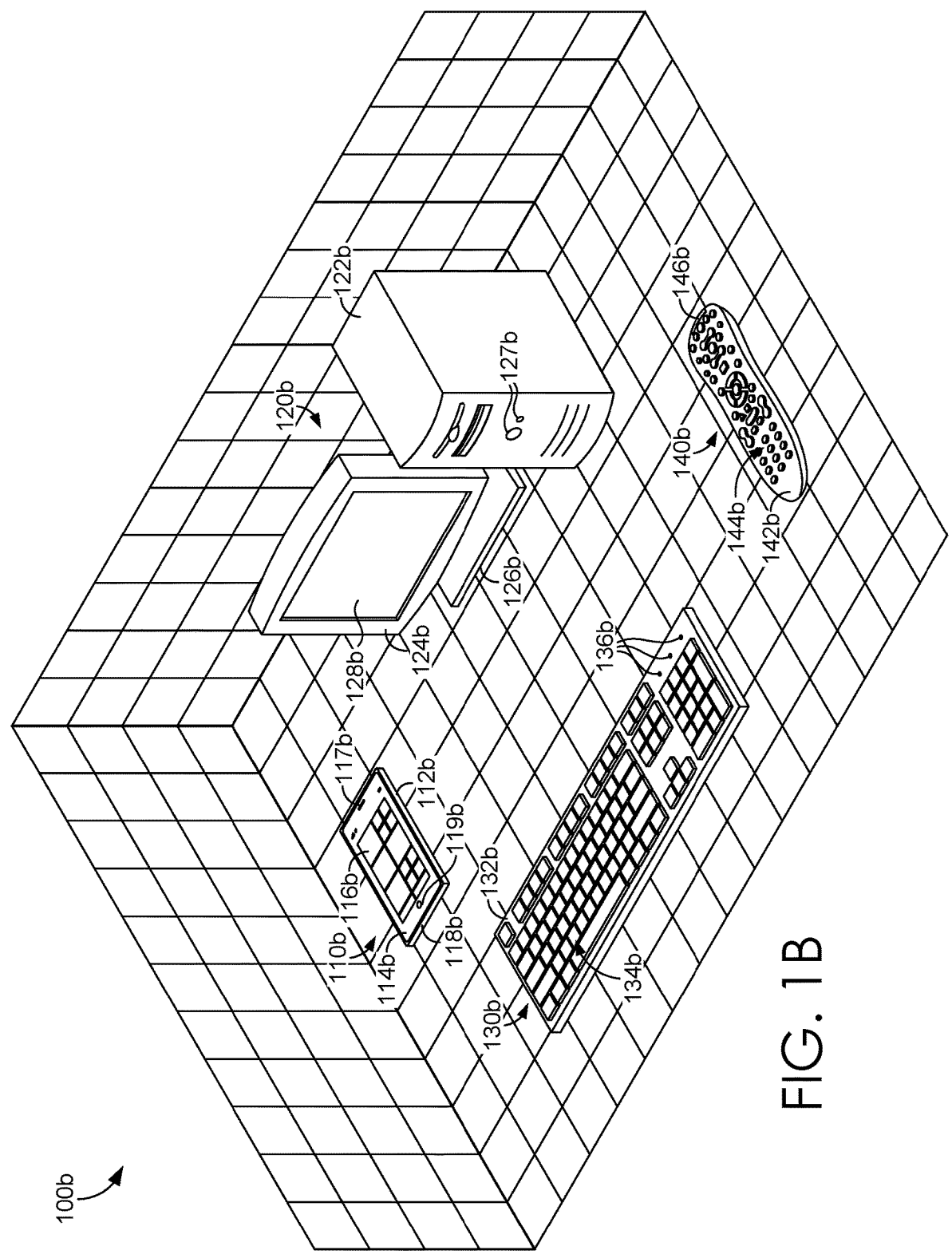
FIG. 1B are illustrations showing exemplary virtual objects that correspond to the electronic devices of FIG. 1A as they would appear in virtual space, in accordance with some implementations of the present disclosure.

With brief reference to FIGS. 1A-1B, several electronic devices 110a, 120a, 130a, 140a and corresponding virtual objects 110b, 120b, 130b, 140b are illustrated merely for purposes of explaining the present disclosure, and are not intended to be limiting in any way. Looking now at FIG. 1A, a mobile device 110a, a computing device 120a, a keyboard 130a, and a remote control 140a are each examples of some electronic devices as they are perceived in physical space 100a, in accordance with embodiments of the present disclosure. Electronic devices can include any device having circuitry and at least one interactive control element that, when interacted with, can initiate an operation or function of the device. Electronic devices can include any of the illustrated devices, as well as game controllers, remotes, mice, tablets, telephones, switches, thermostats, servers, vehicles, GPS devices, wearables, toys, vehicles, machinery, appliances, control boards, and the like, including any device considered an Internet-of-things (IoT) device.

Each of the electronic devices 110a, 120a, 130a, 140a in physical space 100a have interactive real portions and non-interactive real portions. In accordance with embodiments described herein, a non-interactive real portion is any part of the electronic device that does not provide an electronic or digital interface between the device and a user, does not include circuitry, and/or does not receive an input or provide an output directly or indirectly. In essence, strictly structural aspects of an electronic device can be considered a non-interactive real portion, in accordance with embodiments described herein.

For example, looking at mobile device 110a, the visible non-interactive real portions thereof may include, among other things, the mobile device outer shell 112a and the bezel 114a. In another example, looking at computing device 120a, the non-interactive real portions may include, among other things, the desktop case 122a, the monitor bezel 124a, and monitor stand 126a. In another example, looking at keyboard 130a, the non-interactive real portions may include, among other things, the keyboard outer shell 132a. In another example, looking at remote control 140a, the non-interactive real portions may include, among other things, the remote control outer shell 142a.

In accordance with embodiments described herein, an interactive real portion is any part of the electronic device that can provide an electronic interface between the device and a user, does include circuitry, and/or can receive an input or provide an output. In essence, any non-strictly-structural and/or functional aspect of an electronic device can be considered an interactive real portion in accordance with embodiments described herein. In accordance with embodiments described herein, the interactive real portion can include one or more interactive real control elements, which are independent components of the interactive real portion.

For example, looking at mobile device 110a, the interactive real control elements of the interactive real portion thereof may include, among other things, the digital touchscreen 116a, the speaker 117a, the microphone 118a, the home button 119a, orientation sensors (e.g., accelerometer, gyroscope, magnetometer) (not shown), positional sensors (e.g., GPS radio, infrared lights, infrared cameras, motion sensors, light sensors, 3D scanners, CMOS sensors, etc.) (not shown), and proximity sensors (e.g., infrared blasters) (not shown). In another example, looking at computing device 120a, the interactive real control elements of the interactive real portion may include, among other things, the computer button(s) 127a, the monitor display 128a, and monitor buttons (not shown). In another example, looking at keyboard 130a, the interactive real control elements of the interactive real portion may include, among other things, the keys 134a and the indicator lights 136a. In another example, looking at remote control 140a, the interactive real portions may include, among other things, the buttons 144a and the infrared (IR) blaster 146a.

Looking now to FIG. 1B, each of the electronic devices 110a, 120a, 130a, 140a of FIG. 1A are illustrated in FIG. 1B as corresponding virtual objects, as they would be rendered in virtual space 100b in accordance with embodiments of the present disclosure. Each of the virtual objects 110b, 120b, 130b, 140b in virtual space 100b have interactive virtual portions that correspond to interactive real portions of a corresponding electronic device, and non-interactive virtual portions that correspond to non-interactive real portions of a corresponding electronic device.

In accordance with embodiments described herein, a non-interactive virtual portion is any virtualized part of the electronic device that does not provide a virtual electronic interface between the virtual object and a user, does not include virtualized circuitry, and/or does not receive a virtual input or provide a virtual output in virtual space. In essence, any strictly structural aspect of an electronic device can be rendered in virtual space as a corresponding non-interactive virtual portion of a virtual object in accordance with embodiments described herein.

For example, looking at virtual object 110b corresponding to mobile device 110a of FIG. 1A, the non-interactive virtual portions thereof may include, among other things, the virtual object outer shell 112b and the virtual bezel 114b. In another example, looking at virtual object 120b corresponding to computing device 120a of FIG. 1A, the non-interactive virtual portions may include, among other things, the virtual desktop case 122b, the virtual monitor bezel 124b, and virtual monitor stand 126b. In another example, looking at virtual object 130b, the non-interactive virtual portions may include, among other things, the virtual keyboard outer shell 132b. In another example, looking at virtual object 140b, the non-interactive virtual portions may include, among other things, the virtual remote control outer shell 142b.

In accordance with embodiments described herein, an interactive virtual portion is any virtualized part of the electronic device that can provide a virtual electronic interface between the virtual object and a user, does include virtualized circuitry, and/or can receive a virtual input or provide a virtual output in virtual space. In essence, any non-strictly-structural and/or functional aspect of an electronic device can be rendered in virtual space as a corresponding interactive virtual portion of a virtual object in accordance with embodiments described herein. In accordance with embodiments described herein, the interactive virtual portion can include one or more interactive virtual control elements, which are independent virtual components of the interactive virtual portion.

For example, looking at virtual object 110b, the interactive virtual control elements of the interactive virtual portion thereof may include, among other things, the virtual digital touchscreen 116b, the virtual speaker 117b, the virtual microphone 118b, the virtual home button 119b, virtual orientation sensors (e.g., accelerometer, gyroscope, magnetometer) (not shown), virtual positional sensors (e.g., GPS radio, infrared lights, infrared cameras, motion sensors, light sensors, 3D scanners, CMOS sensors, etc.) (not shown), and virtual proximity sensors (e.g., infrared blasters) (not shown). In another example, looking at virtual object 120b, the interactive virtual control elements of the interactive virtual portion may include, among other things, the virtual computer button(s) 127*b*, the virtual monitor display 128*b*, and virtual monitor buttons (not shown). In another example, looking at virtual object 130*a*, the interactive virtual control elements of the interactive virtual portion may include, among other things, the virtual keys 134*b* and the virtual indicator lights 136*b*. In another example, looking at virtual object 140*b*, the interactive virtual control elements of the interactive virtual portions may include, among other things, the virtual buttons 144*b* and the virtual infrared (IR) blaster 146*b*.

A component as used herein refers to any device, process, or service, or combination thereof. A component may be implemented using hardware, software, firmware, a special-purpose device, or any combination thereof. A component may be integrated into a single device or it may be distributed over multiple devices. The various aspects of a component may be co-located or distributed. The component may be formed from other components and aspects thereof.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 2:
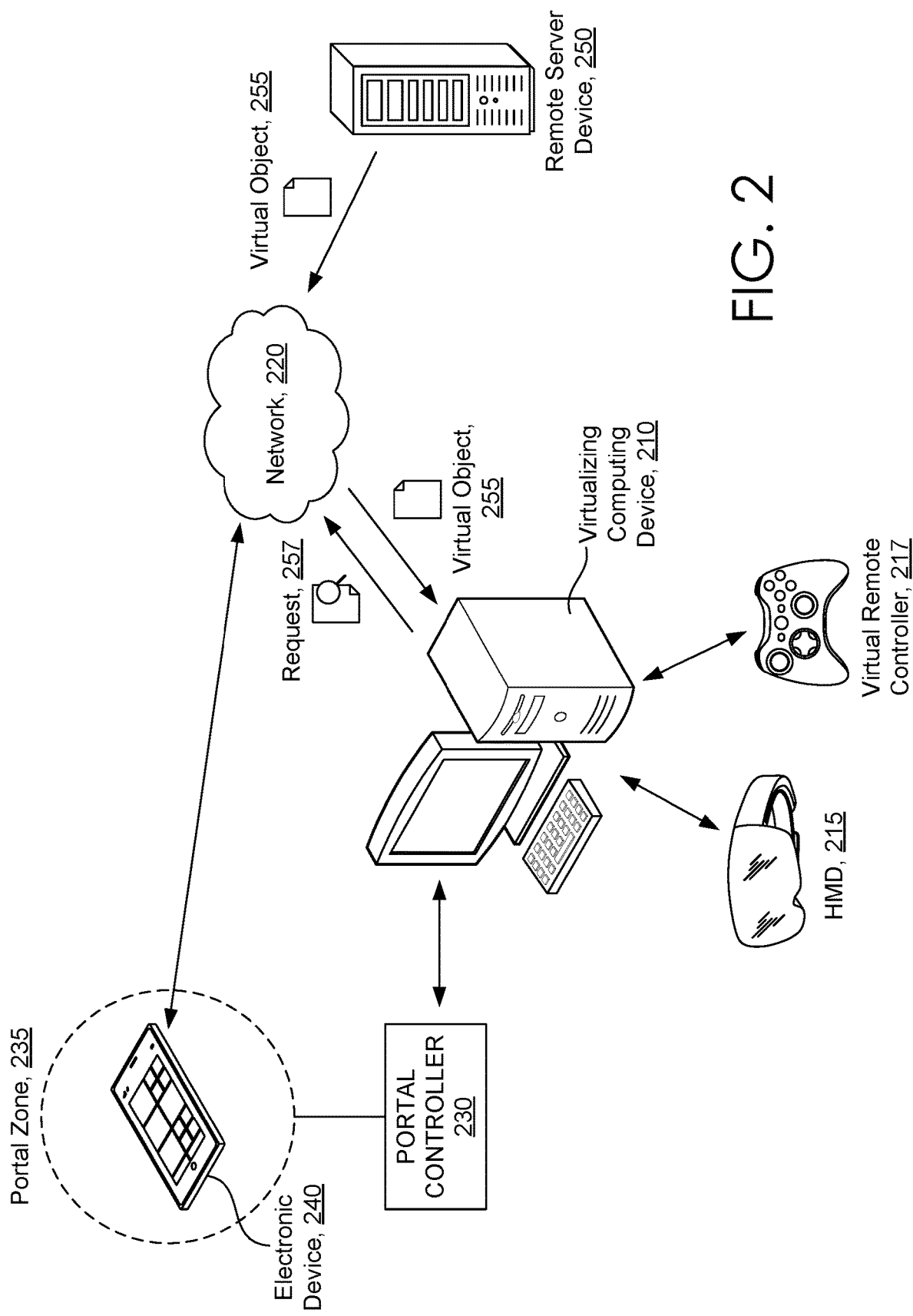
FIG. 2 is a system diagram illustrating an exemplary system environment, in accordance with some implementations of the present disclosure.

Turning now to FIG. 2, a block diagram is provided, illustrating an exemplary system 200 for virtualizing electronic devices for interaction in virtual environments, in accordance with some implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 is an example of a suitable architecture for implementing certain aspects of the present disclosure. It should be understood that any number of user devices and servers may be employed within the system 200 within the scope of the present disclosure. Each of the virtualizing computing devices, servers, HMDs, remote controllers, portal controllers, and electronic devices shown in FIG. 2 may be implemented via a computing device, such as computing device 1100, later described with reference to FIG. 11, for example. The components may communicate with each other via network 220 or some derivation thereof. Each may comprise a single device or multiple devices cooperating in a distributed environment. Additionally, other components not shown may also be included within the system 200.

Among other components not shown, the system 200 includes, at a high level, a virtualizing computing device 210 that enables fully and/or partially-immersive virtual reality experiences. In embodiments, the virtualizing computing device 210 can be coupled to or can comprise a head-mounted display 215 ("HMD"). It is contemplated that any other fully or partially-immersive perceptual technologies, including or not including a HMD, may be employed in accordance with embodiments described herein. That is, embodiments described herein applied to augmented reality applications have been contemplated to be within the purview of the present disclosure. The virtualizing computing device 210 can also be coupled to or can comprise one or more virtual remote controllers 217 that enable interaction with virtual objects rendered in virtual space. It is contemplated that any other interactive technologies (e.g., Microsoft® Kinect® or other motion detectors), including or not including virtual remote controllers, may be employed in accordance with embodiments described herein. The virtualizing computing device 210 can be in communication with a network 220 and can also be associated with a portal controller 230 defining a portal zone 235. The system 200 also includes an electronic device 240 that, when determined to be located within the portal zone 235, can be identified by the virtualizing computing device 210 based on obtained identifying information associated with the electronic device 240.

In some embodiments, the portal controller 230 can enable communication with any computing network, which may include, without limitation, one or more local area networks (LANs), personal area networks (PANs), and/or wide area networks (WANs), such as the Internet. A PAN can be implemented wirelessly, utilizing technologies such as Wireless USB, Bluetooth, ZigBee, IrDA, INSTEON, Z-Wave, Body Area Network, and the like. Like other computing network components (e.g., routers, access points, etc.), the portal controller 230 can provide a portal zone 235 that enables cross-communications between devices located within or in communication with the portal zone 235. The coverage area of portal zone 235 can be based on, among other things, the technology employed to implement the portal controller 230. In some embodiments, portions of the network 220 and portal controller 230 can be one and the same. By way of example, the portal controller 230 can be a router that can facilitate a LAN for virtualizing computing device 210 and electronic device 240. In another example, the portal controller 230 can also be a PAN device that can facilitate a PAN for virtualizing computing device 210 and electronic device 240.

In some other embodiments, the portal zone 235 can be a predefined locus. The portal zone 235 can be, for instance, a general area (e.g., 0.25 mile radius) around a predefined fixed GPS coordinate, an address, or the like. The portal zone 235 can also be a network address that is typically fixed and associated with a particular locus. In some embodiments, the portal controller 230 can be a passive data store (e.g., NFC tag) that is located within a portal zone 235 (e.g., a LAN or PAN area) associated with the virtualizing computing device 210. In other embodiments, the portal controller 230 can be an electromagnetic base station (e.g., an inductive charging pad) having a portal zone 235 (e.g., the charging pad surface area) that is located with the particular locus. In further embodiments, the particular locus is within a coverage area associated with a LAN or PAN area associated with the virtualizing computing device 210.

Once identified, the virtualizing computing device 210 can employ the identifying information associated with the electronic device 240 to obtain a corresponding virtual object 255. In some embodiments, the virtual object can be retrieved from local memory or an external memory device.

In further embodiments, virtualizing computing device 210 can send a request 257 including the identifying information to a remote server device 250. The remote server device 250 can send the appropriate virtual object 255, based on the identifying information, to the requesting virtualizing computing device 210 in response to the request 257.

In some other embodiments, device templates (e.g., virtual machines, virtual machine configuration files, remote desktop clients, remote desktop configuration files, etc.) for generating new virtual objects can be stored in a local library or data store for reference when a device template is needed, or when an electronic device is identified. Device templates may include default hardware configurations and/or standard device capabilities, so that newly identified electronic devices of an unknown type (e.g., having generic functions and/or features) can still be emulated or virtualized. For example, many Android® smartphones may include very similar hardware, but may have slight variations in particular components or subcomponents, such as a camera sensor or speaker quality.

In some embodiments, the virtualizing computing device 210 can bind at least some portions of the obtained virtual object 255 to a virtual machine instance of the electronic device 240, such that the electronic device 240 is ported to or "virtualized" in virtual space and can be effectively utilized by a user immersed in virtual reality. In some other embodiments, the virtualizing computing device 210 can bind at least some portions of the obtained virtual object 255 directly to the electronic device 240. By way of example only, virtual touch inputs to a virtual touchscreen of a virtual object 255, activation of virtual buttons on a virtual object 255, reorientation of a virtual object 255, repositioning of a virtual object 255, audio inputs directed to the virtual object 255, and the like, are some examples of virtual interactions that can be detected in virtual space, obtained by the virtualizing computing device 210, and communicated to the electronic device 240 or a virtual instance of the electronic device 240 as incoming interaction data. For some electronic devices, certain functionalities, such as telephony-related functionalities (e.g., phone calls, messaging, etc.), may not be performed on a virtual instance of the electronic device 240. As such, some embodiments can provide a pass-through (i.e., direct link) for interaction data communicated between an identified electronic device and an interactive virtual portion of a corresponding virtual object.

It is contemplated that these virtual interactions can be detected by any one or more components of the system 200 described herein. For instance, the HMD 215, the one or more virtual remote controllers 217, and/or any other perceptual or interactive technologies utilized to enable the system 200 in accordance with described embodiments can be utilized to detect virtual interactions with a virtual object 255 rendered in virtual space.

By way of example, an identified mobile phone can be virtualized by the virtualizing computing device 210 and bound to a corresponding virtual object 255. The display data of the mobile phone can be provided for display via a virtual representation of the mobile phone rendered in virtual space. If a user pushes a virtual home button of the virtualized mobile phone in virtual space, the virtual input detected by the virtual mobile phone's home button can be sent to the electronic device 240 or a corresponding virtual machine instance, depending on certain implementations of the present disclosure. Similarly, in another example, if a user reorients the virtualized mobile phone in virtual space, the virtual input detected by the virtualized mobile phone's gyroscope or accelerometer can be sent to the electronic device 240 or a corresponding virtual machine instance, depending on certain implementations of the present disclosure.

In some embodiments, the interactive virtual portion of a virtual object can be in communication with a graphics processing unit (GPU) of the virtualizing computing device 210, to obtain transformative data associated with the rendered virtual object as it is manipulated in virtual space. In this way, transformative data can be interpreted as input data received by various interactive virtual control elements. For this example, the virtual gyroscope, accelerometer, and/or magnetometer of the virtualized mobile phone can receive virtual input data that is based on transformative rendering data received by the GPU.

Moreover, display data, graphics, speaker audio, alerts, haptic feedback, notifications, and other forms of output data generated by the identified electronic device 240, or the corresponding virtual machine instance thereof, can be communicated as outgoing interaction data through the virtualizing computing device 210 serving as a proxy to the rendered virtual object 255 for perceivable output therefrom. To this end, identified electronic devices, such as electronic device 240 in accordance with implementations described herein, can be ported from physical space into virtual space, so that users can virtually perceive, interact with, and effectively utilize such electronic devices while fully or partially-immersed in virtual environments. It is contemplated that these perceivable outputs can be provided as physical or virtual outputs by any one or more components of the system 200 described herein. For instance, the HMD 215, the one or more virtual remote controllers 217 and/or any other perceptual or interactive technologies (e.g., motion sensors) utilized to enable the system 200 in accordance with described embodiments can be utilized to receive inputs from a user and/or provide outputs generated by the identified electronic device 240 via its corresponding virtual object 255 rendered in virtual space.

Figure 3:
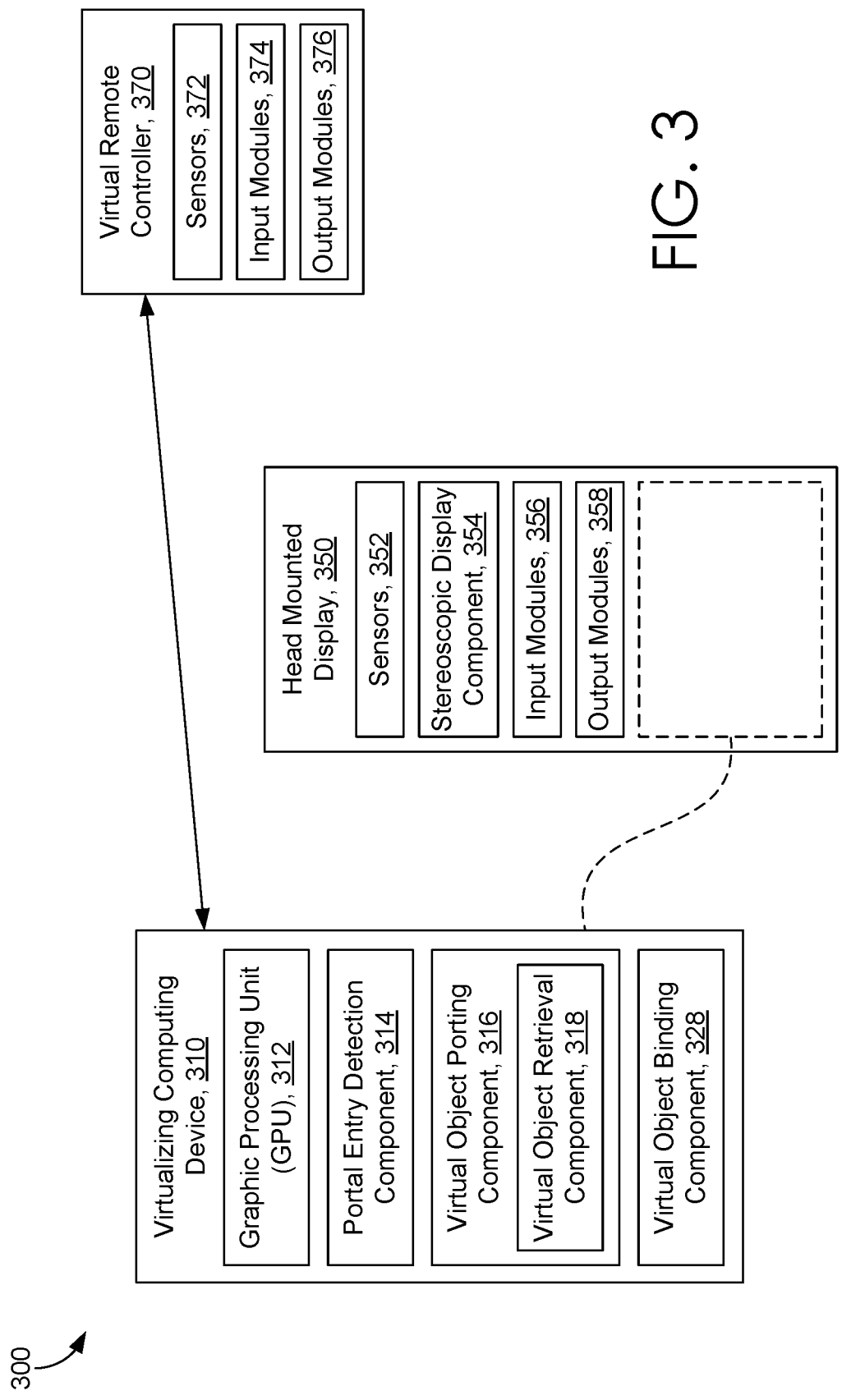
FIGS. 3-5 are block diagrams of exemplary virtualizing computing devices for virtualizing electronic devices in accordance with some implementations of the present disclosure.

With reference now to FIG. 3, a schematic 300 of an exemplary virtualizing computing device for virtualizing electronic devices in accordance with some implementations of the present disclosure is provided. Among other things, a virtualizing computing device 310 can include a graphics processing unit (GPU) 312 for rendering and transforming virtual objects in a rendered virtual environment, a portal entry detection component 314 for determining that an electronic device (for instance, electronic device 240 of FIG. 2) is located within a portal zone associated with the virtualizing computing device 310, a virtual object porting component 316 for identifying the electronic device and providing a rendered virtual object that corresponds to the electronic device, and a virtual object binding component 328 for coupling or "binding" an interactive virtual portion of the virtual object to a corresponding interactive real portion of the electronic device via a network connection established between the identified electronic device and the virtualizing computing device 310.

As described herein above, the virtualizing computing device 310 may be coupled to, or incorporated into, a head-mounted display ("HMD") 350. The HMD 350 can include several components, including sensors 352 (e.g., accelerometer, gyroscope, magnetometer, infrared receiver, GPS radio, light sensor, 3D scanner, CMOS sensor, etc.), a stereoscopic display component 354, input modules (e.g., microphone, user input buttons), output modules 358 (e.g., speakers, haptic systems, LEDs), and/or the virtualizing computing device 310, among other things. In some embodiments, the HMD 310 can also include a forward-facing camera (not shown). In various embodiments, the sensors 352, stereoscopic display component 354, input and output modules 356, 368 and/or forward facing camera can be integrated into the HMD 350, integrated into the virtualizing computing device 310, or at least integrated in part with each the HMD 350 and virtualizing computing device 310.

Similarly, the virtualizing computing device 310 can be integrated within the HMD 350, coupled to the HMD 350, or inserted into the HMD 350. In any configuration, the HMD 350 can employ sensors 352 to determine a position and/or orientation of a user wearing the HMD 350, employ stereoscopic display component 354 to display or project a stereoscopic rendering of a virtual environment for perception by the user, employ a graphics processing unit (GPU) 312 of the computing device 310 to render the virtual environment and virtual objects therein, employ a forward-facing camera to receive digital information from the physical environment to augment the virtual environment, or any combination of the foregoing.

It is contemplated that the combination HMD 350 and virtualizing computing device 310 is just one implementation for virtualizing electronic devices in accordance with the present disclosure and is not intended to be limiting in any way. A variety of immersive technologies can be utilized to enable the virtualizing of electronic devices as described herein.

In some embodiments, the virtualizing computing device 310 can be coupled to one or more virtual remote controllers 370. A virtual remote controller 370 can also include sensors 372 (e.g., accelerometer, gyroscope, magnetometer, infrared receiver, GPS radio, light sensor, 3D scanner, CMOS sensor, etc.), input modules 374 (e.g., microphone, touchscreens, input buttons), and output modules 376 (e.g., speakers, displays, haptic systems, LEDs). In some embodiments, the virtual remote controller 370 can facilitate virtual interactions with virtual objects rendered in virtual space. More specifically, in some embodiments the virtual remote controller 370 can emulate user hand or finger motions to manipulate or interact with rendered virtual objects. In other embodiments, the virtual remote controller 370 can be utilized to anchor a virtual object. More specifically, the virtual object can be virtually fixed to the position and orientation of the virtual remote controller 370 in physical space. By way of example only, if a mobile phone is rendered as a virtual object in virtual space, a virtual remote controller 370 can serve as an anchor to the virtual object, so that virtual object will move in virtual space in accordance with the movement of the virtual remote controller 370 in physical space.

In some further embodiments, at least some of the sensors 372, input modules 374, and/or output modules 376 of the virtual remote controller(s) 370 can be bound to an electronic device (e.g., the mobile phone of the prior example) via the virtualizing computing device 310. By way of example, a microphone on a virtual remote controller can receive incoming interaction data in the form of audio for communication to the identified electronic device. Similarly, a speaker on the virtual remote controller can receive outgoing interaction data in the form of audio for output thereon. In this way, if a virtualized mobile phone was anchored to a virtual remote controller, a user may use the virtual remote controller to conduct phone calls therefrom.

Any one or more of the components, modules, and/or sensors of the virtualizing computing device 310, head mounted display 350, and/or virtual remote controller(s) 370 can be bound, via the virtualizing computing device 310, to a corresponding virtual component, virtual module, and/or virtual sensor of a virtual object in accordance with embodiments described herein. To this end, the virtualizing computing device 310, head mounted display 350, and/or virtual remote controller 370, among other devices or components not shown, can be viewed together as an immersive system that can obtain physical and/or virtual inputs from users, and provide physical and/or virtual outputs to users, to facilitate a virtualizing of electronic devices in accordance with the present disclosure.

The portal entry detection component 314 of virtualizing computing device 310 can be coupled to or in communication with a portal controller, such as portal controller 230 of FIG. 2. As was described herein, the portal controller can be a computing device or a peripheral device coupled to a computing device that defines a portal zone in which an electronic device, in accordance with embodiments described herein, must be located within to be discovered by virtualizing computing device 310.

In some embodiments, the portal controller can detect the presence of the electronic device and obtain identifying information associated with the electronic device upon the detection thereof. In some further embodiments, the detection can be performed based on a negotiation or handshake between the electronic device and the portal controller. For instance, the portal controller can establish a connection with the electronic device via a LAN, PAN, or other networking technology, thereby establishing a connection between the electronic device and the virtualizing computing device 310.

In some other embodiments, the portal controller can passively trigger an identifying operation of the electronic device, particularly when the electronic device detects a substantial proximity to the portal controller (e.g., within the portal zone). For instance, the electronic device can detect a nearby NFC chip, determine that it is placed on an inductive charging pad, or determine that it is within the vicinity of a LAN, PAN or other type of network. Once the electronic device determines that it is within the portal zone, the triggered identifying operation can retrieve location information of the electronic device (e.g., detected GPS coordinates or IP address) and send it, along with identifying information associated with the electronic device, to the virtualizing computing device 310 via the portal controller or a network, such as network 220 of FIG. 2. In this way, the virtualizing computing device 310 can determine that the electronic device is within the portal zone.

The portal entry detection component 314 of virtualizing computing device 310 essentially determines, based on signals received from the portal controller and/or the electronic device, that the electronic device is located within the portal zone. As described, the portal entry detection component 314 can also receive, from the portal controller and/or electronic device, identifying information associated with the electronic device determined to be within the portal zone.

The virtual object porting component 316 of virtualizing computing device 310 can identify the electronic device, obtain a virtual object corresponding to the identified electronic device, and provide a rendered virtual object that corresponds to the electronic device, among other things. The virtual object porting component 316 can identify the electronic device based on identifying information associated with the electronic device. The identifying information can be provided to the virtual object porting component 316 from the portal controller 230 of FIG. 2 or from the electronic device itself.

The virtual object porting component 316 can include a virtual object retrieval component 318 that can obtain a virtual object that corresponds to an electronic device determined to be within the portal zone, or in other words, corresponds to an identified electronic device. The virtual object can be obtained by the virtual object retrieval component 318 referencing identifying information associated with the identified electronic device. In some embodiments, the virtual object retrieval component 318 can retrieve a virtual object corresponding to the electronic device from a remote server device, such as remote server device 250 of FIG. 2. The virtual object can be retrieved by sending a request including identifying information associated with the electronic device to the remote server device. In some other embodiments, the virtual object retrieval component 318 can retrieve the virtual object from a computer-readable storage medium, such as local storage or a removable media device.

In some embodiments, the virtual object porting component 316 can locally provision a virtual machine that corresponds to the interactive real portion of the electronic device determined to be within the portal zone. In this way, most, if not all of the electronic device's functional aspects can be performed locally on the virtualizing computing device 310.

In some other embodiments, the virtual object portion component 316 can facilitate remote desktop control of the electronic device determined to be within the portal zone. In this way, most, if not all of the electronic device's functional aspects can be performed remotely on the electronic device, but are perceived as being performed locally on the virtualizing computing device 310

The virtual object binding component 328 of virtualizing computing device 310 can couple, map, or "bind" an interactive virtual portion of the virtual object to a corresponding interactive real portion of the electronic device via the established network connection between the virtualized computing device 310 and the identified electronic device. The virtual object binding component 328 can map interactive portions of the virtual object to corresponding interactive portions of the real electronic device. In other words, each interactive virtual control element for receiving inputs (also referenced herein as "virtual input component") (e.g., button, capacitive touch sensor, microphone, IR receiver, etc.) of a virtual object is bound to the identified electronic device, such that detected virtual inputs to the virtual input components are communicated to the electronic device to be processed as real inputs detected by corresponding interactive real control elements for receiving inputs (also referenced herein as "real input components"). Similarly, each interactive virtual control element for providing outputs (also referenced herein as "virtual output component") (e.g., display, speaker, LEDs, IR blaster, etc.) of a virtual object is bound to the electronic device, such that real outputs generated by the electronic device and intended for its interactive real control elements for providing outputs (also referenced herein as "real output components") are communicated to the virtualizing computing device 310 to be provided as outputs utilizing virtual output components perceivable by the user in virtual space.

By way of example only, and with brief reference to electronic device 110a of FIG. 1A and 110b of FIG. 1B, the binding operation may bind real touchscreen 116a to virtual touchscreen 116b, speaker 117a to virtual speaker 117b, real microphone 118a to virtual microphone 118b, and real home button 119a to virtual home button 119b. It is contemplated that not every component needs to be bound between an electronic device and its corresponding virtual object. In fact, certain components of an electronic device can be bound to other input and/or output components of the immersive system, as described in accordance with embodiments described herein.

Porting Electronic Devices with Virtual Machines

As described herein, the obtained virtual object 255 of FIG. 2 can include an interactive virtual portion that corresponds to the interactive real portion of the identified electronic device, and a non-interactive virtual portion that corresponds to the non-interactive real portion of the identified electronic device. As was also described herein, the virtual object porting component 316 of virtualizing computing device 310 can identify the electronic device, obtain a virtual object corresponding to the identified electronic device, and provide a rendered virtual object that corresponds to the electronic device, among other things.

Figure 4:
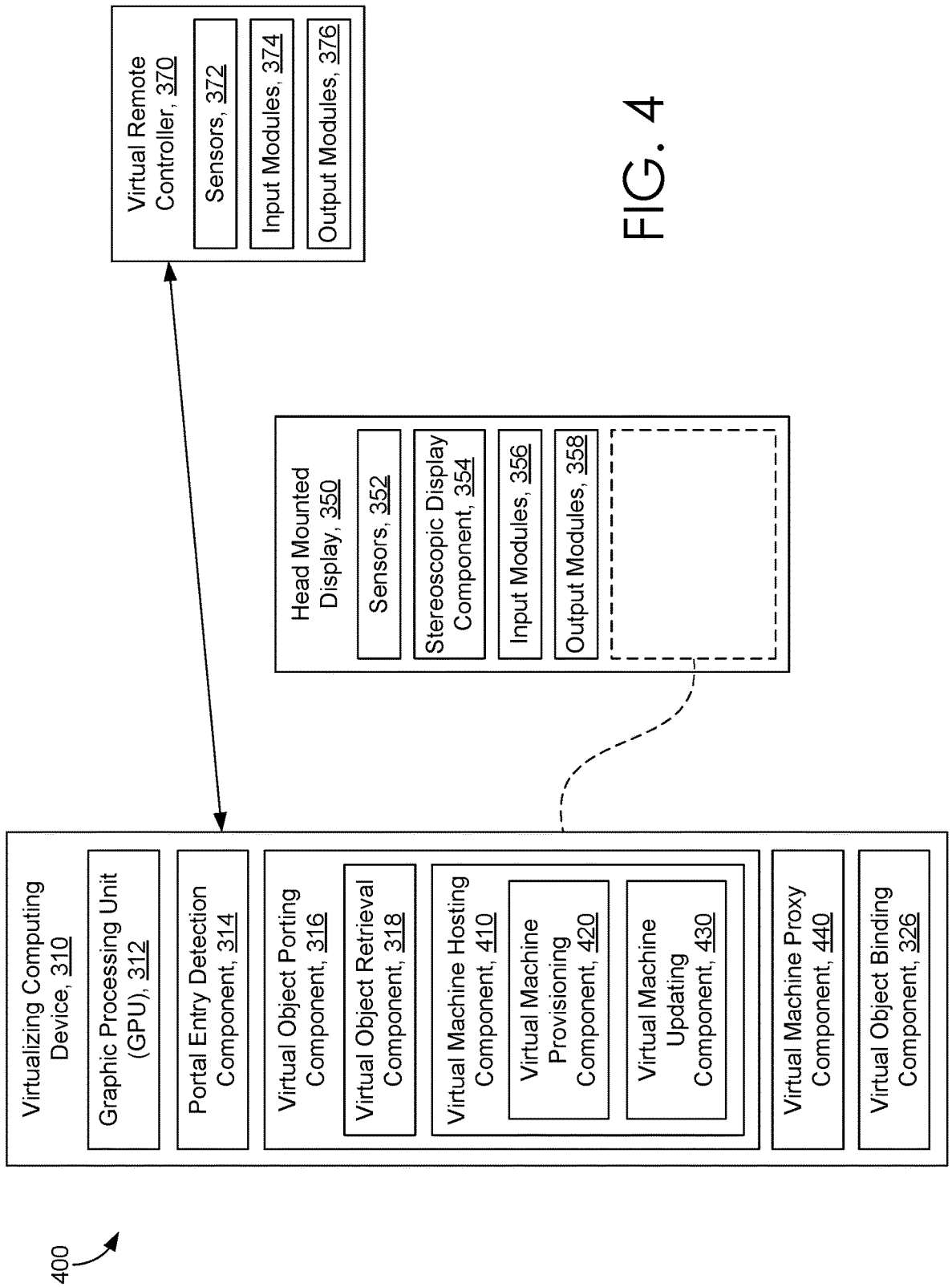

Turning now to FIG. 4, with reference to FIGS. 1-3 a schematic 400 of another exemplary virtualizing computing device for virtualizing electronic devices in accordance with some implementations of the present disclosure is provided. In some embodiments, the virtual object porting component 316 can include a virtual machine hosting component 410 for provisioning, instantiating, and updating a virtual machine instance that locally emulates the interactive real portion of the electronic device determined to be within the portal zone, and a virtual machine proxy component 440 for establishing a virtualized remote operation session (e.g., a network connection) between the identified electronic device and the virtual machine emulating the identified electronic device. In embodiments, at least some of the interactive real portion of the identified electronic device can be emulated locally on the virtualizing computing device 310. In some embodiments, the obtained virtual object corresponding to the identified electronic device can include or be accompanied with a virtual machine hosting framework that can be employed by the virtualizing computing device 310 to provision the virtual machine instance that corresponds to the identified electronic device. In essence, the virtual object can include or be accompanied with a configuration file, virtual machine image, emulator, or some other data file that the virtualizing computing device 310 can utilize to provision a virtual machine that is based on the electronic device determined to be within the portal zone.

By way of example only, if the electronic device is identified as a Microsoft® Lumia® 950, the virtual object retrieval component 318 of the virtualizing computing device 310 can retrieve a virtual object corresponding to the Microsoft® Lumia® 950 device. The non-interactive virtual portion of the virtual object can include a structural 3D model and corresponding textures that, when rendered, replicate the physical appearance of the Microsoft® Lumia® 950. Moreover, the interactive virtual portion of the virtual object can further include a virtual machine hosting framework that can be employed by the virtual machine provisioning component 420 of the virtual machine hosting component 410 to provision a virtual machine instance that emulates at least the interactive real portion of the Microsoft® Lumia® 950.

After the virtual object is obtained and a virtual machine instance based on the virtual machine hosting framework is provisioned, the virtual object binding component 328 of virtualizing computing device 310 can bind at least some parts of the interactive virtual portion of the virtual object to corresponding parts of the interactive real portion of the virtual machine instance. In this way, virtual interactions with the virtual object detected in virtual space can be communicated as incoming interaction data, via the virtualizing computing device 310 serving as a proxy, to the virtual machine emulating the identified electronic device for processing as real interactions. On the same note, visual and audio outputs generated by the virtual machine emulating the electronic device can be communicated as outgoing interaction data to the virtualizing computing device 310, for processing as perceivable outputs via the rendered virtual object, HMD, virtual remote controller, and/or other output device(s) coupled to the virtualizing computing device 310, and facilitating the virtualization of the identified electronic device in accordance with embodiments described herein.

In some further embodiments, the virtual object binding component 328 can bind some parts of the interactive virtual portion of the virtual object to corresponding parts of the interactive real portion of the virtual machine instance, while remaining parts of the interactive virtual portion are directly coupled to corresponding parts of the interactive real portion of the electronic device. In some embodiments, the remaining parts of the interactive virtual portion bound to the remaining parts of the interactive real portion of the electronic device may be associated with telephony features that cannot be emulated by a virtual machine.

As the virtual object includes the virtual machine hosting framework, it is contemplated that the virtual machine hosting framework includes proper mapping information for each interactive virtual control element and interactive real control element of the identified electronic device. By way of example only, the virtual machine hosting framework can map a virtual touchscreen of a virtual object to a touchscreen of a virtual machine emulating an identified electronic device. When corresponding virtual and real control elements are mapped, detected virtual inputs are communicated to the virtual machine to be processed as real or actual inputs. In this example, detected virtual inputs to the virtual touchscreen are communicated to the virtual machine to be processed as real or actual inputs to the emulated touchscreen (e.g., to navigate the device). Similarly, display data generated for display on the emulated touchscreen (e.g., reactions to touches) can be communicated to the virtual object and rendered on the virtual touchscreen thereof.

In another example, the virtual machine hosting framework can map a virtual volume rocker of a virtual object to an emulated volume rocker of an identified electronic device. In this regard, detected virtual inputs to the virtual volume rocker are communicated to the virtual machine emulating the identified electronic device, to be processed as physical presses to the emulated volume rocker (e.g., to adjust volume). Similarly, display data generated for display on the emulated touchscreen (e.g., volume adjustment indicator) can be communicated to the virtual object and rendered on the virtual touchscreen thereof.

The virtual machine proxy component 440 of virtualizing computing device 310 can establish a virtualized remote operation session with the electronic device. In embodiments, the virtual machine proxy component 440 can establish the virtualized remote operation session between the virtualizing computing device 310 and the identified electronic device. In accordance with embodiments described herein, a virtualized remote operation session can be a network connection between the virtualizing computing device 310 and the identified electronic device. In some embodiments, the network connection to the electronic device can be facilitated by utilizing the host name or network address (e.g., IP address) associated with the electronic device when it is determined to be within the portal zone (for instance, by portal entry detection component 314). It is contemplated that the network connection can be any form of wired or wireless connection that enables two-way communications between the electronic device and the virtualizing computing device 310. In various embodiments, the network connection can be facilitated utilizing network 220 or portal controller 230 of FIG. 2.

In some embodiments, the virtual machine hosting component 320 can ensure that the provisioned virtual machine instance emulating the identified electronic device is up-to-date with a current state of the identified electronic device. More particularly, the virtual machine hosting component 320 can include a virtual machine updating component 430 that, upon determining that the virtualizing computing device 310 and identified electronic device are in communication, can query the identified electronic device to determine whether a virtual object state of the provisioned virtual machine instance is different than a real device state of the identified electronic device. The virtual machine updating component 430 can make the determination that a difference exists utilizing a variety of methods including, comparing hashes of the real device state and the virtual object state, comparing event logs associated with each of the identified electronic device and the virtual machine, and comparing file modification times and/or dates associated with each of the identified electronic device and the virtual machine, among other methods.

When the virtual machine updating component 430 determines that a difference exists between the virtual object state of the provisioned virtual machine instance and a real device state of the identified electronic device, the virtual machine updating component 430 can obtain the determined difference (i.e., a "delta") between the virtual object state and the real device state. In some embodiments, the determined delta can include a plurality of files that together make up the determined delta. In various embodiments, the determined delta can be identified by at least one of the electronic device or the virtualizing computing device. To this end, the virtualized electronic device is always up-to-date and emulates a "virtually" identical copy of the identified electronic device. It is contemplated that an initial comparison of the virtual object state and real device state, and the updating of the virtual object state may take the greatest amount of time as the delta between the two device states would be the greatest at this point.

In further embodiments, the virtual machine hosting component 320 can ensure that the electronic device is updated with any changes made to the provisioned and up-to-date virtual machine emulating the electronic device. Similar to the updating process described above, the virtual machine updating component 430 can ensure that the identified electronic device is updated with any changes made to the virtual object state while the virtualized electronic device (i.e., the virtual object) was utilized in virtual space. It is contemplated that the virtual machine updating component 430 can update the identified electronic device at any time during or after a period the virtualized electronic device is utilized in virtual space. To avoid any bandwidth concerns, the identified electronic device can be updated in portions of limited size during utilization of the virtualized electronic device. When the identified electronic device is updated after utilization (e.g., after the user stops interacting with the virtualized electronic device), bandwidth may be a lesser concern and the electronic device may be updated in a single or larger portion(s).

Porting Electronic Devices with Remote Desktop Applications

Figure 5:
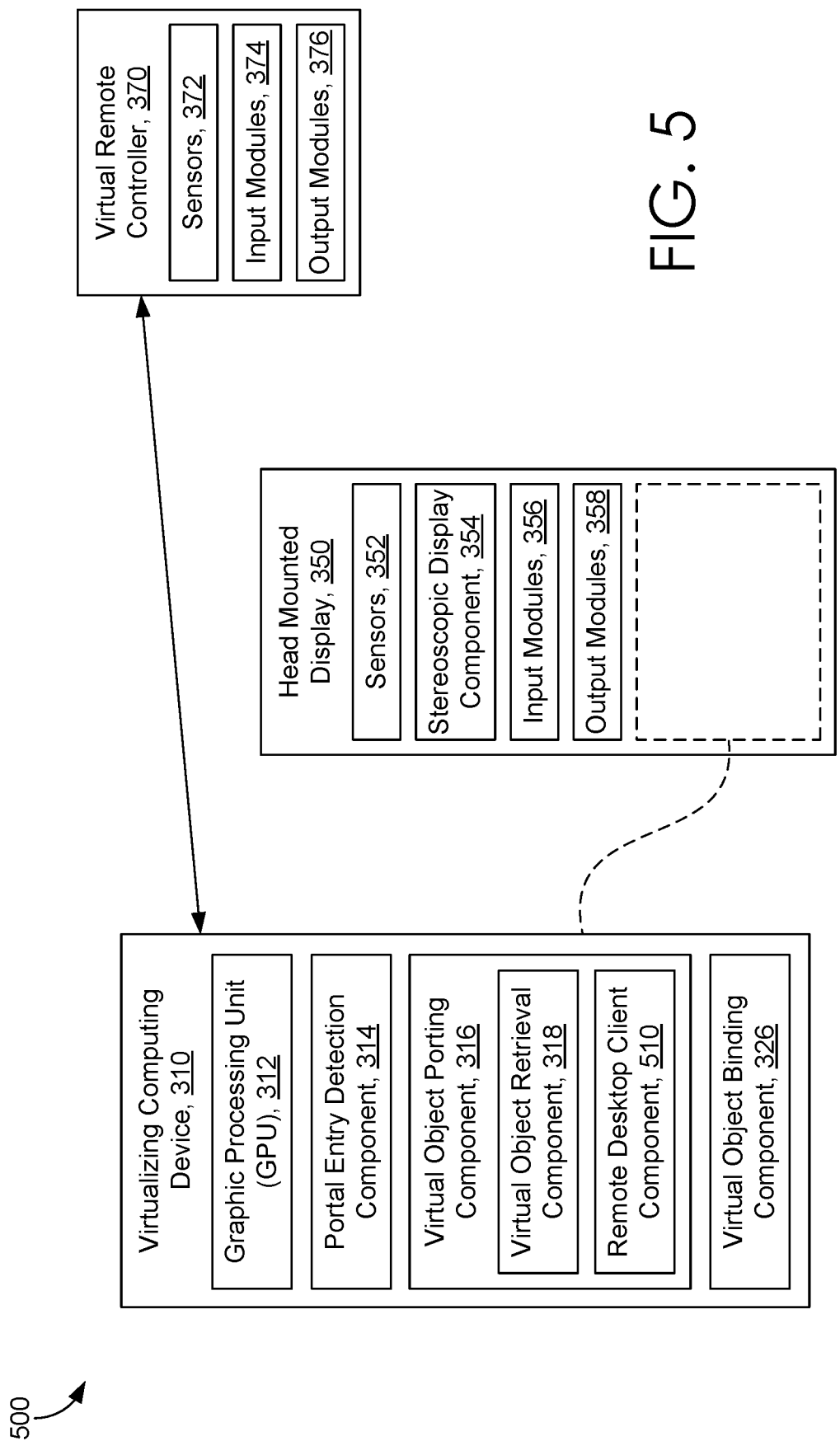

Turning now to FIG. 5, with reference to FIGS. 1-3 a schematic 500 of another exemplary virtualizing computing device for virtualizing electronic devices in accordance with some implementations of the present disclosure is provided. In some embodiments, the virtual object porting component 316 can include a remote desktop client component 510 for remotely interfacing with (e.g., controlling and/or viewing) the interactive real portion of the identified electronic device. To this end, the interactive real portion of the identified electronic device can be remotely perceived and/or interacted with on the virtualizing computing device 310.

In some embodiments, the obtained virtual object corresponding to the identified electronic device can include or be accompanied with a remote desktop framework that can be employed by the virtualizing computing device 310. In essence, the virtual object can include or be accompanied by a remote desktop framework that is or comprises configuration file that describes the capabilities of the identified electronic device, so that the remote desktop client component 510 can properly initialize a remote desktop interface to communicate with the electronic device determined to be within the portal zone.

In some other embodiments, the virtual object can include or be accompanied by a remote desktop framework that is or comprises a customized remote desktop client that enables a customized interfacing with the identified electronic device. In some implementations, the remote desktop client can employ any remote desktop protocol for facilitating two-way communications between a remote desktop host (i.e., the identified electronic device) and a corresponding remote desktop client (i.e., the virtual object). In some other implementations, the remote desktop client can employ any remote display protocol for facilitating predominantly, if not completely, one-way display communications from a remote display host (i.e., the identified electronic device) to a corresponding remote display receiver (i.e., the virtual object). Remote display protocols facilitating one-way display communications can include any wired or wireless display technology, such as Miracast, DLNA, or any other Universal Plug-and-Play Audio/Video (UPnP AV) architecture, by way of example only. In the event the remote desktop client is configured for one-way display communications, it is contemplated that a corresponding input/output protocol, not necessarily facilitating the exchange of display data, be included in the remote desktop framework or included in the virtual object to accompany the remote desktop framework. The input/output protocol can include any of the aforementioned technologies, or variations thereof, which enables the two-way exchange of non-visual input and output data (e.g., audio data, input data, positional sensor data, orientation sensor data, etc.) between a client and a corresponding host.

By way of example only, if the electronic device is identified as a Microsoft® Lumia® 950, the virtual object retrieval component 318 of the virtualizing computing device 310 can retrieve a virtual object corresponding to the Microsoft® Lumia® 950 device. The non-interactive virtual portion of the virtual object can include a structural 3D model and corresponding textures that replicate the physical appearance of the Microsoft® Lumia® 950. Moreover, the interactive virtual portion of the virtual object can further include a remote desktop framework that can be utilized by the remote desktop client component 510 that is operable to seamlessly connect to and communicate with a remote desktop host executing on the Microsoft® Lumia® 950. In this way, the interactive virtual portion of the virtual object can provide a remote access interface, rendered as an interactive texture on the rendered virtual object, to control the functional aspects (e.g., the interactive virtual portion) of the Microsoft® Lumia® 950.

After the virtual object is obtained and a remote desktop client based on the remote desktop framework is initialized, the virtual object binding component 328 of virtualizing computing device 310 can bind at least some interactive virtual portions of the virtual object to corresponding interactive real portions of the identified electronic device. In this way, virtual interactions with the virtual object detected in virtual space can be communicated as incoming interaction data, via the virtualizing computing device 310 serving as a proxy, to the electronic device for processing as real interactions. On the same note, visual and audio outputs generated by the electronic device can be communicated as outgoing interaction data to the virtualizing computing device 310 for processing as perceivable outputs via the rendered virtual object, HMD, virtual remote controller, and/or other output device(s) coupled to the virtualizing computing device 310 and enabling the virtualization of the identified electronic device in accordance with embodiments described herein.

As the virtual object includes the remote desktop framework, it is contemplated that the remote desktop framework includes proper mapping information for each interactive virtual control element and interactive real control element of the identified electronic device. In other words, the capabilities of the identified electronic device described by the remote desktop framework can ensure that certain interactive components of the identified electronic device are mapped to appropriate functionalities of the remote desktop client. In embodiments, particular virtual control elements that are rendered as parts of a virtual object are properly mapped to the capabilities of the remote desktop client, such that detected interactions with the particular virtual control elements are detected and communicated accordingly to the remote desktop host via the remote desktop client.

By way of example only, the remote desktop framework can map a virtual touchscreen area of the remote desktop client associated with a virtual object to a touchscreen capability of the identified electronic device. When mapped, detected virtual inputs (e.g., to navigate the device) to the remote desktop client rendered as a virtual touchscreen on the virtual object are communicated to the remote desktop host executing on the electronic device to be processed as real inputs to the touchscreen. Similarly, display data that would typically be generated for display on the physical touchscreen of the identified electronic device is communicated from the remote desktop host executing on the electronic device to the remote desktop client, and rendered for display on the virtual touchscreen of the rendered virtual object.

In another example, the remote desktop framework can map a virtual speaker of the remote desktop client associated with a virtual object to a speaker capability of the identified electronic device. In this regard, audio outputs generated by the identified electronic device are communicated from the remote desktop host executing on the identified electronic device to the remote desktop client to be provided for output via audio output mechanisms (e.g., speakers, headphones, etc.) managed by the remote desktop client and associated with the immersive system. Similarly, audio data received by audio input mechanisms (e.g., microphones) managed by the remote desktop client and associated with the immersive system can be communicated from the remote desktop client to the remote desktop host to be processed as audio inputs to the identified electronic device.

Figure 6:
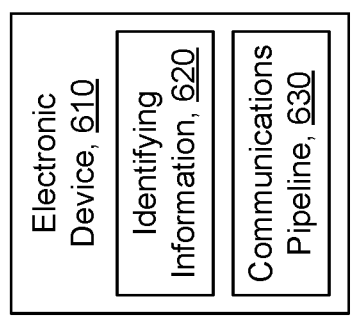
FIG. 6 is a block diagram of an exemplary electronic device that can be virtualized, in accordance with some implementations of the present disclosure.

Turning now to FIG. 6, with reference to FIGS. 1-5, a schematic 600 of an exemplary electronic device 610 that can be virtualized in accordance with implementations of the present disclosure is provided. As was noted above, the electronic device shown in FIG. 2 can be implemented via a computing device, such as computing device 1100, later described with reference to FIG. 11, for example. To this end, the electronic device 610 can also include identifying information 620 associated therewith. The identification information can be stored in a memory, such as a computer readable medium, an RFID, an NFC tag, or other electronically identifiable piece of information associated with the electronic device 610. The identifying information can be detected wirelessly, based entirely on the presence of the corresponding electronic device 610 located within a portal zone in accordance with embodiments described herein.

In embodiments, the electronic device 610 can include a communications pipeline 630 that can facilitate two-way communications between a virtualizing computing device, such as virtualizing computing device 210 of FIG. 2, and the electronic device 610. In some embodiments, the two-way communications can be enabled by the communications pipeline 630 utilizing hardware, instructions, and/or code that facilitate the establishment of a virtualized remote operation session with a remote computing device, such as virtualizing computing device 210 of FIG. 2.

In some embodiments, the communications pipeline 630 can include or be in communication with a remote desktop host (not shown) that is operable to execute on the electronic device 610 and can facilitate remote desktop control of the various input and output components of the electronic device. In some other embodiments, the communications pipeline 630 can facilitate pass-through communications between such components of the electronic device to a remote computing device, such as virtualizing computing device 210 of FIG. 2.

Methods for Virtualizing Electronic Devices

Figure 7:
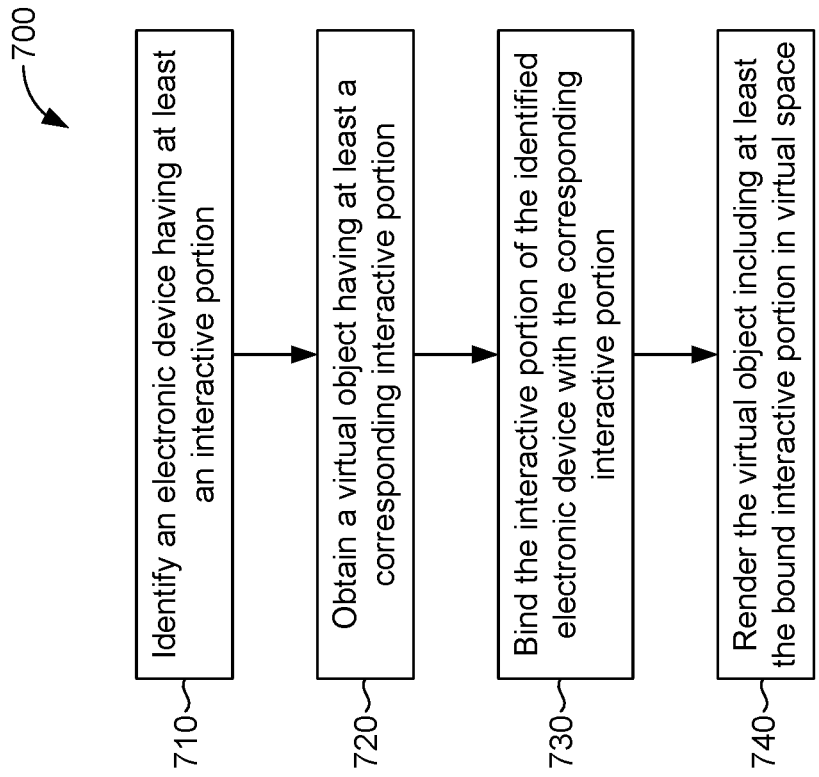
FIG. 7 is a flow diagram showing a method for virtualizing electronic devices, in accordance with some implementations of the present disclosure.

Having described various aspects of the present disclosure, exemplary methods are described below for virtualizing electronic devices for interaction in virtual environments. Referring to FIG. 7 in light of FIGS. 1-4, FIG. 7 is a flow diagram showing a method 700 for virtualizing an electronic device for interaction in a virtual environment. Each block of method 700 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 710, an electronic device determined to be located within a portal zone is identified by a virtualizing computing device, such as virtualizing computing device 210 of FIG. 2, or a computing device in communication with a virtualizing computing device. The electronic device has identifying information associated therewith, that enables a remote computing device, such as the virtualizing computing device, to identify the electronic device. The identifying information can include one or more unique identifiers, such as a model number, a manufacturer, a revision number, and the like. The identified electronic device can also include an interactive real portion and a non-interactive real portion. The interactive real portion of the identified electronic device can include one or more interactive control elements or components that facilitate inputs to and/or outputs from the device. By way of example only, the interactive real portion can include a touchscreen, an input mechanism, a microphone, LEDs, an orientation sensor, and/or a position sensor, among many other things. The non-interactive real portion of the identified electronic device can include one or more non-interactive elements or components, such as the device casing, bezel, and other non-functional design or construction features.

At block 720, a virtual object that corresponds to the identified electronic device is obtained by the virtualizing computing device or computing device in communication therewith. The virtual object can be obtained from a remote server device, from a local storage device, or an external storage device. The virtualizing computing device can obtain the virtual object by referencing the identifying information associated with the electronic device. This information can be included in a request to the remote server device or included as a parameter to extract the virtual object from a library or data store. The obtained virtual object can include an interactive virtual portion that corresponds to the interactive real portion of the identified electronic device. The obtained virtual object can also include a non-interactive virtual portion that corresponds to the non-interactive real portion of the identified electronic device. In embodiments, the non-interactive virtual portion can include a 3D model with textures that, when rendered together, can provide a virtual replica of the non-interactive portion of the identified electronic device in virtual space. The interactive virtual portion can be implemented as a virtual machine or a remote desktop client, and rendered as a dynamic texture fixed to the rendered non-interactive portion.

In some embodiments, the interactive virtual portion of the obtained virtual object can include a customized virtual machine framework. The virtualizing computing device can employ the virtual machine framework to provision a virtual machine instance that emulates the interactive real portion of the identified electronic device. In other words, almost all, if not all interactive virtual control element (e.g., input and/or output components) associated with the identified electronic device can be emulated locally, on the virtual machine instance, so that an interactive virtual instance of the identified electronic device is locally executing on the virtualizing computing device. In some embodiments, particular portions of the interactive real portion of the identified electronic device cannot be emulated on the virtual machine instance (e.g., telephony features). As such, the virtualizing computing device can provide a pass-through connection for particular portions of the virtual object so that input and/or output components of the virtual object are directly coupled to corresponding components of the electronic device.

In some other embodiments, the interactive virtual portion of the obtained virtual object can include a customized remote desktop framework. The virtualizing computing device can employ the remote desktop framework to establish a remote desktop connection to the identified electronic device. In such embodiments, the electronic device can include a remote desktop host that is executing thereon. The remote desktop host can be executing as a background service that can establish remote desktop sessions with corresponding remote desktop clients, or in other words, remote desktop clients that are configured based on the remote desktop framework corresponding to the identified electronic device.

At block 730, the virtualizing computing device or coupled computing device can bind the interactive virtual portion of the obtained virtual object to the corresponding interactive real portion of the identified electronic device. In other words, each interactive control element of the identified electronic device is mapped to a corresponding interactive virtual control element of the virtual object. For example, the touchscreen of the electronic device is bound, or in other words mapped, to the virtual touchscreen of the virtual object corresponding to the electronic device. In this way, virtual inputs received by the virtual touchscreen are communicated to the electronic device to be processed as actual inputs received by the electronic device. In some embodiments, the identified electronic device can remain in a visibly inactive state (e.g., the screen remains turned off) as incoming interaction data generated in response to detected virtual inputs is transmitted from the virtualizing computing device to the electronic device and processed on the electronic device.

At block 740, the virtual object including the bound interactive virtual portion and non-interactive virtual portion is rendered in virtual space so that the identified electronic device can be virtually interacted with. In other words, the identified electronic device can be virtualized as a virtual object rendered within a virtual environment, so that virtual interactions (e.g., virtual touches, reorientations, repositioning, detected audio, etc.) with the interactive virtual portion of the virtual object can be detected by the virtualizing computing device, and/or components coupled thereto (e.g., HMD, virtual remote controllers, etc.), and communicated to the identified electronic device to be processed as real interactions with the corresponding interactive real portion of the identified electronic device.

Figures 8, 9:
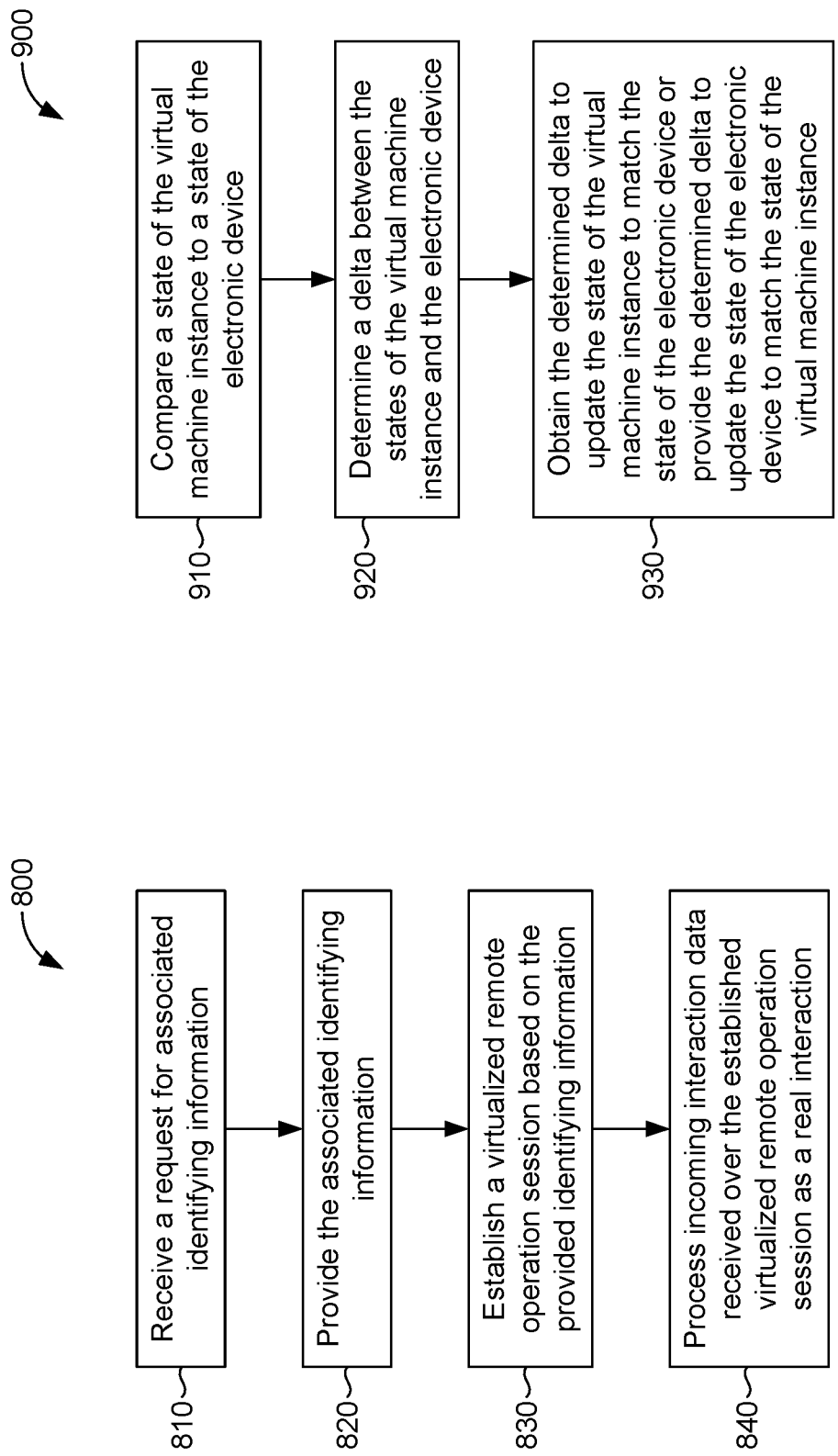
FIG. 8 is a flow diagram showing another method for virtualizing electronic devices, in accordance with some implementations of the present disclosure.
FIG. 9 is a flow diagram showing a method for updating device states when virtualizing electronic devices, in accordance with some implementations of the present disclosure.

Referring now to FIG. 8 in light of FIGS. 1-3 and 5, FIG. 8 is a flow diagram showing a method 800 for virtualizing an electronic device for interaction in a virtual environment. Each block of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 810, a request for identifying information is received at an electronic device, such as electronic device 240 of FIG. 2. The request is received from a remote computing device, such as virtualizing computing device 210 of FIG. 2, in response to the electronic device being determined to be located within a portal zone (for instance, portal zone 235 of FIG. 2) associated with the remote computing device.

At block 820, the associated identifying information is provided to the remote computing device. This information can be provided by the electronic device to the remote computing device as communications sent over a network, a peer-to-peer connection, or some other wireless connection.

At block 830, a virtualized remote operation session is established between the remote computing device and the electronic device. The remote computing device can be configured to render a virtual object that is based on the provided identifying information. The remote computing device can also bind an interactive virtual portion of the rendered virtual object to either an interactive real portion of a virtual machine that emulates the corresponding electronic device, or to the actual interactive real portion of the corresponding electronic device.

In some embodiments, the virtual machine can be provisioned by the remote computing device utilizing a virtual machine framework included in the virtual object. In this regard, a virtual machine instance can locally emulate the identified electronic device on the remote computing device, which can help with overall speed and dependability of the virtualization experience.

In some other embodiments, the remote computing device can be bound to the virtual machine over a remote desktop session. The remote desktop session can be established utilizing a remote desktop client that is based on the remote desktop framework included in the obtained virtual object. The remote desktop client can establish, over a virtualized remote operation session between the virtualizing computing device and the electronic device, a remote desktop session to virtually control the identified electronic device. The virtualized remote operation session can be any network connection between the devices in accordance with embodiments described herein.

At block 840, incoming interaction data is generated by the remote computing device as virtual interactions are detected in association with the rendered virtual object. The incoming interaction data can be generated by the virtual machine instance of the identified electronic device, in accordance with some embodiments, or can be generated by the remote desktop client providing a remote desktop interface to the interactive real portion of the identified electronic device. The incoming interaction data is detected and communicated to the electronic device, from the remote computing device, to the electronic device over the virtualized remote operation session.

The incoming interaction data is received by the electronic device and processed as one or more real interactions with the interactive real portion of the electronic device. In this way, interactions are virtually received, but in effect, performed on the electronic device.

Referring now to FIG. 9 in light of FIGS. 1-4, FIG. 9 is a flow diagram showing a method 900 for updating a virtualized electronic device configured for interaction in a virtual environment. Each block of method 900 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 910, a state of the provisioned virtual machine instance is compared to a state of the electronic device to determine if a difference between the states exist. The determination can be made by the remote computing device on which the virtual machine instance is executing, or can be performed by the electronic device. The determination can be made by comparing a hash of each state, a modification timestamp of each state, an event log associated with each state, and other commonly utilized techniques.

The virtual machine instance corresponds to an electronic device, such as electronic device 240 of FIG. 2, and is provisioned by a remote computing device, such as virtualizing computing device 210 of FIG. 2. The virtual machine instance is provisioned based on a virtual object having a virtual machine framework included therein. The virtual machine framework can include capabilities, features, components, modules, configuration files, and other features specific to the identified electronic device. In this way, when the virtual machine framework is employed by the remote computing device to provision a virtual machine instance, a barebones virtual machine of the interactive portion of the identified electronic device is instantiated.

When the determination is made that the states are different, at block 920, a delta (i.e., a difference) between the state of the electronic device and the state of the virtual machine instance is determined. The delta can be a file or multiple files that circumscribes the differences between the current virtual machine state and the current electronic device state.

At block 930, the delta state can be communicated to the identified electronic device from the remote computing device, or to the remote computing device from the identified electronic device, depending on whichever one has the older state. In some embodiments, a delta state of the electronic device can be communicated to the remote computing device, to update the virtual machine instance, in response to a determination that a virtualized remote operation session is established between the electronic device and the identified electronic device, and that a current state of the electronic device is newer than a current state of the virtual machine instance. The delta state can include one or more portions that are different between the current electronic device state and current virtual machine state. The delta state can be communicated utilizing one or more portions, based on bandwidth availability. In some embodiments, the delta state can be communicated utilizing one or more portions depending on whether the delta state transfer is performed during virtual interactions with the virtual object, after virtual interactions are halted, or are determined to be inactive (e.g., the virtual object is set down).

In some other embodiments, the delta state of the virtual machine instance can be communicated to the electronic device, to update the electronic device, in response to a determination that a virtual interaction with the virtual object is terminated or inactive, and that a current state of the virtual machine instance is newer than a current state of the electronic device. As described, the delta state can include one or more portions that are different between the current electronic device state and current virtual machine state. The delta state can be communicated utilizing one or more portions, based on bandwidth availability. In some embodiments, the delta state can be communicated utilizing one or more portions depending on whether the delta state transfer is performed during virtual interactions with the virtual object, after virtual interactions are halted, or are determined to be inactive (e.g., the virtual object is set down).

Figure 10B:
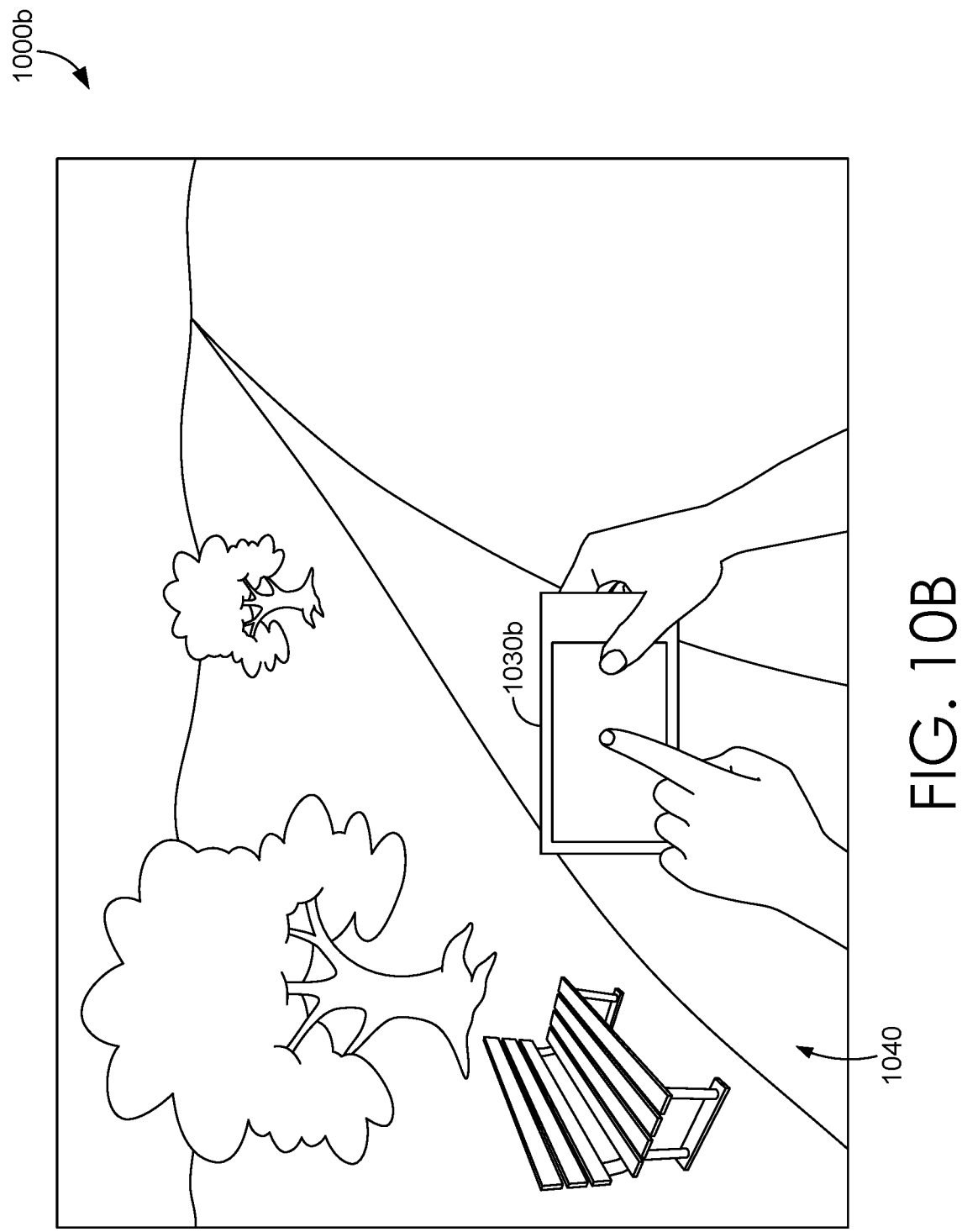
FIG. 10B is an illustration showing an exemplary virtual space for utilizing virtualized electronic devices, in accordance with some implementations of the present disclosure.

With reference to FIG. 10A, an exemplary image of a head-mounted display (HMD) device 1002 being utilized by a user 1004 in physical space 1000a is depicted. Virtualized objects provided by the HMD device typically appear in immersive virtual space in virtual reality configurations. Here, the physical space may include real-world objects, such as a countertop 1010 and a shelf 1020. In accordance with embodiments described herein, a mobile computing device 1030a appears to be sitting on the shelf 1020 and is presumably located within a portal zone associated with the HMD 1002. In virtual reality, however, the user is completely immersed in the virtual environment and cannot perceive the real-world objects. Looking now to FIG. 10B, a preview of the virtual space 1000b viewed by the user 1004 of FIG. 10A is depicted. The currently perceived field of view 1040 is provided, showing a virtualized object 1030b that corresponds to the mobile computing device 1030a. The user 1004 of FIG. 10A is depicted in FIG. 10B as virtually utilizing an electronic device determined to be in a portal zone, particularly the mobile phone 1030a, in accordance with embodiments described herein.

Having described embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Accordingly, in one embodiment described herein, a method for virtualizing electronic devices is provided. The method includes identifying an electronic device located within a portal zone. The electronic device can have at least an interactive portion. In some instances, the electronic device can also have a non-interactive portion. The method also includes obtaining a virtual object that corresponds to the identified device. The virtual object can include an interactive virtual portion that corresponds to the interactive real portion of the identified electronic device, among other things. The method further includes binding the interactive virtual portion of the obtained virtual object to the corresponding interactive real portion of the identified electronic device. The method also includes rendering the virtual object including at least the bound interactive virtual portion in virtual space to enable virtual interaction with the identified electronic device.

In some embodiments, the interactive virtual portion of the obtained virtual object includes at least one interactive virtual control element. The interactive virtual control element being one of a virtual touchscreen, a virtual input mechanism, a virtual microphone, a virtual orientation sensor, and a virtual position sensor.

In some embodiments, the method further comprises obtaining incoming interaction data that is generated in response to detected virtual interaction with the interactive virtual portion of the rendered virtual object, and sending the obtained incoming interaction data to the identified electronic device to be processed as a real interaction with the interactive real portion of the identified electronic device.

In some embodiments, the method further comprises receiving outgoing interaction data from the identified electronic device, and processing the received outgoing interaction data for output via the interactive virtual portion of the obtained virtual object.

In some embodiments, the interactive virtual portion of the obtained virtual object includes one of a virtual machine hosting framework and a remote desktop framework, each customized to facilitate virtualized remote operation of the identified electronic device.

In some embodiments, the method further comprises provisioning a virtual machine instance that is based on the virtual machine hosting framework, the provisioned virtual machine instance being configured to locally emulate the identified electronic device.

In some embodiments, the method further comprises updating the provisioned virtual machine instance with a first determined delta between a virtual object state of the provisioned virtual machine instance and a real device state of the identified electronic device.

In some embodiments, the method further comprises sending a second determined delta between the virtual object state and the real device state to the identified electronic device to update the identified electronic device.

In some embodiments, the remote desktop framework includes described capabilities of the interactive real portion of the identified electronic device.

In some embodiments, the method further comprises establishing a remote desktop connection that is based on the remote desktop framework to the identified electronic device.

In some embodiments, the electronic device located within the portal zone is identified based on detected identifying information associated therewith.

In some embodiments, the virtual object is obtained by receiving the virtual object from a remote server device, wherein the remote server device is configured to send the virtual object based on the detected identifying information associated with the identified electronic device.

In some embodiments, obtaining the virtual object includes generating the virtual object utilizing a locally-stored device template that is based at least in part on the identified electronic device or capabilities thereof.

In another embodiment described herein, one or more computer storage media having computer-executable instructions embodied thereon that, when executed, by one or more processors, causing the one or more processors to execute operations for virtualizing electronic devices is provided. The operations include receiving a request from a remote computing device for identifying information that is associated with an electronic device located within a portal zone. The operations further include providing the associated identifying information to the remote computing device. The operations further include establishing a virtualized remote operation session with the remote computing device, wherein the remote computing device is configured to render a virtual object based on the provided identifying information, and bind an interactive virtual portion of the rendered virtual object to an interactive real portion of the corresponding electronic device. The operations further include processing incoming interaction data that is received from the remote computing device as a real interaction with the interactive real portion of the electronic device, wherein the remote computing device is configured to send the incoming interaction data to the electronic device via the established virtualized remote operation session.

In some embodiments, the remote computing device is further configured to obtain the incoming interaction data that is generated in response to detected virtual interaction with the interactive virtual portion of the rendered virtual object.

In some embodiments, the virtualized remote operation session is established utilizing one of a virtual machine proxy and a remote desktop host, each being configured to process the incoming interaction data that is received from the remote computing device as the real interaction with the interactive real portion of the electronic device.

In another embodiment, a system for virtualizing electronic devices is provided. The system can include, among other things, a client computing device. The client computing device can have a processor, a memory for providing computer-executable instructions to the processor, and a virtual object binding component to bind an interactive virtual portion of a virtual object to an interactive real portion of an identifiable host electronic device when it is determined to be within a portal zone.

In some embodiments, the virtual object binding component can bind the interactive virtual portion of the virtual object to the interactive real portion of the host electronic device by mapping at least one interactive virtual control element of the interactive virtual portion to at least one corresponding interactive real control element of the interactive real portion, wherein an interactive virtual control element is one of a virtual touchscreen, a virtual input mechanism, a virtual microphone, a virtual orientation sensor, and a virtual position sensor.

In some embodiments, the client computing device can also have a portal entry detection component to determine that the host electronic device is located within the portal zone associated with the client computing device.

In some embodiments, the client computing device can also have a virtual object retrieval component to obtain a virtual object corresponding to the host electronic device based on identifying information associated with the host electronic device.

In some embodiments, the system can further comprise a virtual object porting component.

In some embodiments, the virtual object porting component can establish a virtualized remote operation session with the host electronic device determined to be located within the portal zone.

In some embodiments, the virtual object porting component can obtain incoming interaction data that is generated in response to detected virtual interaction with the interactive virtual portion of the virtual object rendered in virtual space.

In some embodiments, the virtual object porting component can send the obtained incoming interaction data to the host electronic device to be processed as a real interaction with the interactive real portion of the host electronic device, wherein the obtained incoming interaction data is sent via the established virtualized remote operation session.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display unit comprising or coupled to a virtualizing computing device; however, the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. On a virtual reality display device, a computer-implemented method for virtualizing a physical electronic device in a portal zone of the virtual reality display device, the method comprising:
   displaying on the virtual reality display device application content from an application running on the virtual reality display device;
   receiving identifying information associated with the physical electronic device in the portal zone, the physical electronic device comprising a display;

rendering a virtual object representing the physical electronic device in the portal zone based on the identifying information received, wherein the virtual object comprises a virtual display that corresponds to the display of the physical electronic device in the portal zone;

receiving, from the physical electronic device in the portal zone, display data generated for display on the display of the physical electronic device in the portal zone; and rendering, on the virtual display, the display data from the physical electronic device in the portal zone such that the virtual display is displayed over a portion of the application content of the application running on the virtual reality display device.

2. The method of claim 1, wherein the physical electronic device comprises an input component and the virtual object comprises a virtual input portion corresponding to the input component, and wherein the method further comprises translating a detected interaction with the virtual input portion of the virtual object into outgoing interaction data and communicating the outgoing interaction data to the physical electronic device.

3. The method of claim 2, wherein one of a virtual machine hosting framework and a remote desktop framework is employed to facilitate the translation of the detected interaction.

4. The method of claim 3, further comprising provisioning a virtual machine instance that emulates the physical electronic device in the virtual environment when the virtual machine hosting framework is employed.

5. The method of claim 4, further comprising updating the virtual machine instance when a first determined delta between a virtual object state of the provisioned virtual machine instance and a real device state of the physical electronic device is detected.

6. The method of claim 5, further comprising sending a command to the physical electronic device to update when a second determined delta between a virtual object state of the virtual machine instance and a real device state of the physical electronic device is detected.

7. The method of claim 3, further comprising establishing a remote desktop connection between the computing device and the physical electronic device when the remote desktop framework is employed.

8. The method of claim 2, wherein the virtual input portion of the virtual object includes one or more of a virtual input mechanism, a virtual microphone, a virtual orientation sensor, and a virtual position sensor.

9. The method of claim 1, wherein the virtual object comprises a virtual output portion including the virtual display, and wherein the virtual output portion of the virtual object is adapted to provide for outputting incoming interaction data received from the physical electronic device.

10. The method of claim 1, further comprising determining that the physical electronic device is located within the portal zone based at least in part on a detected proximity of the physical electronic device to a portal controller of the network, wherein the portal controller defines the portal zone.

11. The method of claim 1, further comprising receiving the virtual object from a remote server.

12. The computer-implemented method of claim 11, wherein receiving the virtual object model is based at least partially upon a determination that a locally-stored device template that corresponds at least in part to the identified physical electronic device or capabilities thereof is absent from a memory of the computing device.

13. A virtual reality display device, comprising:
a processor; and
a storage device comprising instructions executable by the processor to:
display on the virtual reality display device application content from an application running on the virtual reality display device;
receive identifying information associated with a physical electronic device in a portal zone, the physical electronic device comprising a display,
render a virtual object representing the physical electronic device in the portal zone based on the identifying information received, wherein the virtual object comprises a virtual display that corresponds to the display of the physical electronic device in the portal zone;
receive, from the physical electronic device in the portal zone, display data generated for display on the display of the physical electronic device in the portal zone, and
render, on the virtual display, the display data from the physical electronic device in the portal zone such that the virtual display is displayed over a portion of the application content of the application running on the virtual reality display device.

14. The virtual reality display device of claim 13, wherein the physical electronic device comprises an input component and the virtual object comprises a virtual input portion corresponding to the input component, and wherein the instructions are further executable to translate a detected interaction with the virtual input portion of the virtual object into outgoing interaction data and communicating the outgoing interaction data to the physical electronic device.

15. The virtual reality display device of claim 13, wherein the instructions are further executable to receive an update of the display data generated for display on the physical electronic device, and to update rendering, on the virtual display, of the display data generated for display on the physical electronic device.

16. The virtual reality display device of claim 13, wherein the virtual object comprises a virtual output portion including the virtual display, and wherein the instructions are executable to adapt the virtual output portion of the virtual object to provide for outputting incoming interaction data received from the physical electronic device.

17. The virtual reality display device of claim 13, wherein the instructions are further executable to determine that the physical electronic is located within the portal zone based at least in part on a detected proximity of the physical electronic device to a portal controller of the network, wherein the portal controller defines the portal zone.

18. A virtual reality display device, comprising:
a processor; and
a storage device comprising instructions executable to:
display on the virtual reality display device application content from an application running on the virtual reality display device;
receive identifying information associated with a mobile phone in a portal zone, the mobile phone comprising a display,
render a virtual object representing the mobile phone in the portal zone based on the identifying information received, wherein the virtual object comprises a virtual display that corresponds to the display of the mobile phone in the portal zone;

receive, from the mobile phone in the portal zone, display data generated for display on the display of the mobile phone in the portal zone, and render, on the virtual display, the display data from the mobile phone in the portal zone such that the virtual display is displayed over a portion of the application content of the application running on the virtual reality display device.

19. The virtual reality display device of claim 18, wherein the mobile phone comprises an input component and the virtual object comprises a virtual input portion corresponding to the input component, and wherein the instructions are further executable to translate a detected interaction with the virtual input portion of the virtual object into outgoing interaction data and communicating the outgoing interaction data to the mobile phone.

20. The virtual reality display device of claim 18, wherein the instructions are further executable to receive an update of the display data generated for display on the mobile phone, and update rendering, on the virtual display, of the display data generated for display on the mobile phone.

\* \* \* \* \*